United States Patent
Verdun

(10) Patent No.: US 9,436,255 B2
(45) Date of Patent: Sep. 6, 2016

(54) DC-POWERED SYSTEM SIDE CONTROL OF AC-DC ADAPTER PRIMARY SIDE SWITCHING CIRCUITRY

(71) Applicant: Gary J. Verdun, Georgetown, TX (US)

(72) Inventor: Gary J. Verdun, Georgetown, TX (US)

(73) Assignee: Dell Products LP, Round Rock, TX (US)

( * ) Notice: Subject to any disclaimer, the term of this patent is extended or adjusted under 35 U.S.C. 154(b) by 327 days.

(21) Appl. No.: 14/082,592

(22) Filed: Nov. 18, 2013

(65) Prior Publication Data

US 2015/0143150 A1    May 21, 2015

(51) Int. Cl.
  *G06F 1/00*  (2006.01)
  *G06F 1/32*  (2006.01)
  *G06F 1/26*  (2006.01)

(52) U.S. Cl.
  CPC ............. *G06F 1/3203* (2013.01); *G06F 1/263* (2013.01)

(58) Field of Classification Search
  CPC ........... G06F 1/32; G06F 1/26; H02M 7/217
  See application file for complete search history.

(56) References Cited

U.S. PATENT DOCUMENTS

| | | |
|---|---|---|
| 5,297,015 A | 3/1994 | Miyzazki et al. |
| 7,378,819 B2 | 5/2008 | Wang et al. |
| 7,391,184 B2 | 6/2008 | Luo et al. |
| 7,392,410 B2 | 6/2008 | Allen et al. |
| 7,911,817 B2 | 3/2011 | Kasprzak et al. |
| 8,138,722 B2 | 3/2012 | Wang et al. |
| 2010/0100752 A1* | 4/2010 | Chueh .................. G06F 1/3203 713/320 |
| 2011/0248681 A1 | 10/2011 | Miller et al. |
| 2014/0176048 A1* | 6/2014 | Uan-Zo-Li ........ H02M 3/33507 320/107 |

OTHER PUBLICATIONS

Reddy, "Systems and Methods for Providing Supplemental Power to Battery Powered Information Handling System", U.S. Appl. No. 13/495,631, filed Jun. 13, 2012, 37 pgs.

* cited by examiner

*Primary Examiner* — Jaweed A Abbaszadeh
*Assistant Examiner* — Austin Hicks
(74) *Attorney, Agent, or Firm* — Egan, Peterman, Enders & Huston LLP

(57) ABSTRACT

Systems and methods are provided for enabling control of adapter primary side switching circuitry of an AC-DC adapter by a DC-powered information handling system that is connected to the AC-DC adapter for receiving DC power from the AC-DC adapter.

28 Claims, 7 Drawing Sheets

DC-POWERED SYSTEM SIDE CONTROL OF AC-DC ADAPTER PRIMARY SIDE SWITCHING CIRCUITRY

FIELD OF THE INVENTION

This invention relates generally to information handling systems and, more particularly, to control of AC-DC adapter primary side switching circuitry by a connected DC-powered information handling system.

BACKGROUND OF THE INVENTION

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

External AC-DC adapters or power supplies are commonly employed to convert alternating current (AC) wall current to direct current (DC) for powering DC-powered systems, including DC-powered information handling systems such as notebook computers. DC-powered information handling systems are typically configured to operate in one or more non-operational host power states in which the host CPU is non-operational (e.g., sleeping, "soft off" or "mechanical off" states), such as Advanced Configuration and Power Interface (ACPI) G1 sleeping states S1, S2, S3, S4; G2 "soft off" state S5, and G3 "mechanical off" state. Regulatory bodies around the world are creating ever-lower specifications for maximum allowable non-operational power consumption in an effort to reduce or eliminate so called "Vampire" power. New types of non-operational host power states such as Microsoft Windows connected standby (CS) and always on always connected (AOAC) states noticeably increase the minimum power of a DC-powered system during the non-operational host power state, which increases the risk of exceeding regulatory limits for sleep or "Off" state power.

As long as the AC mains switcher of a conventional AC-DC adapter is operating during a non-operational host power state of a connected DC-powered device, a floor is established for AC power consumption that can exceed current or future established regulatory limits. To address this problem, an AC-DC adapter configuration has been previously implemented that employs a controller within the DC adapter circuitry to turn off the AC mains switcher of the AC adapter when no power supplier identifier (PSID) signals are detected by the adapter controller as being received from a connected operating DC-powered system (i.e., DC-powered system is not connected), and that allows the AC-DC adapter output voltage to bleed down during such times to a voltage level that is below established regulation limits. Other conventional AC-DC adapter configurations have been implemented that utilize an adapter controller within the AC-DC adapter to enable a low power or zero power adapter mode during detected no load or system sleep states of an attached DC-powered system. Such conventional AC-DC adapters require some user interaction with the adapter (typically requiring the user to push a button on the adapter) to recover the adapter to a normal power supplying operating mode. Anytime such a conventional AC-DC adapter is on, the adapter DC output stays in regulation limits with the primary side switcher circuitry on and running.

Some current three-wire AC-DC adapters implement a low power mode when no system is connected to the AC-DC adapter in order to get no-load AC-DC adapter power consumption to below 100 milliwatts. In particular, if the system load power of a coupled DC-powered system is below a very low power level and the AC-DC adapter senses an open circuit on the third wire (e.g., PSID pin) then the AC-DC adapter enters this low power mode. If the PSID pin gets terminated or if the load suddenly increases then the AC-DC adapter will go back into normal operation. In the low power mode the AC-DC adapter turns off the AC mains switcher and allows the output voltage to droop. The controller for the switching regulator which includes the detection capabilities mentioned above resides on the secondary side of the AC-DC adapter and will continue to operate from the energy stored in the output filter capacitors. Once the DC output voltage of the AC-DC adapter reaches a lower limit then the secondary controller of the AC-DC adapter will turn on the AC mains switcher and re-charge the output capacitors to the nominal operating voltage of the AC-DC adapter. The cycle then repeats as long as the system load power remains below a very low power level.

SUMMARY OF THE INVENTION

Disclosed herein are systems and methods for enabling control of adapter primary side (AC mains) switching circuitry of an AC-DC adapter by a DC-powered information handling system that is connected for receiving DC power from the AC-DC adapter. DC-powered systems with which the disclosed systems and methods may be employed include any information handling system that operates at least part of the time on DC power that is provided by separate AC-DC adapter circuitry that is configured to be coupled to AC mains and to convert AC mains power to DC power using primary side switching circuitry. Examples of such DC-powered information handling systems include, but are not limited to, portable and/or mobile information handling systems such as notebook computers, netbook computers, tablet computers, smart phones, mp3 players, etc. Advantageously, the disclosed systems and methods may be implemented in one exemplary embodiment to reduce average AC power draw of such portable and/or mobile information handling systems while operating in a reduced power state and electrically connected to an operating AC-DC adapter that is receiving AC mains power. Examples of reduced power states include, but are not limited to, a non-operational host power state in which a host processing device (e.g., such as CPU) of the DC-powered information handling system that executes a system operating system (e.g., Windows OS, Linux OS, etc.) is not active, i.e., is not executing the operating system or other instructions.

In one exemplary embodiment, the disclosed systems and methods may be implemented to put on/off control of AC mains primary side adapter circuitry in the hands of a processing device (e.g., such as embedded controller) that is a part of a separate connected DC-powered information handling system and that is not part of the AC-DC adapter circuitry. In such an embodiment, when a DC-powered information handling system is in a non-operational host power state (e.g., such as a CS state, AOAC state or other non-operational host power state), system side control circuitry within the DC-powered information handling system (e.g., such as an embedded controller or other system side processing device) may be configured to provide a command signal to adapter side control circuitry (e.g., microcontroller or other processing device) within the AC-DC adapter to instruct the adapter side control circuitry to turn off the AC mains switching circuitry within the AC-DC adapter or to put the AC mains switching circuitry into a pulsed mode that reduces the average AC power draw of the AC-DC adapter during the non-operational system state, e.g. to below about 100 milliwatts in one exemplary embodiment, and alternatively to about 0 watts in another exemplary embodiment. In either case, the system side controller may also be configured to instruct the AC adapter side circuitry to turn on (or cease pulsing) the AC mains switching circuitry when the system transitions from the non-operational host power state to an operational state, and the AC adapter side circuitry may respond to this command by placing the AC mains switching circuitry into non-pulsed "on" condition without any user interaction, i.e. without requiring any form of user input.

In one exemplary embodiment, the disclosed systems and methods may be further implemented using a paired AC-DC adapter and DC-powered system that operate together using periodic and/or sporadic synchronization ("sync" events), e.g., during which time the system may check for incoming emails and calendar updates, etc. In such a case, the system side control circuitry may instruct the adapter side control circuitry to turn off or pulse the AC mains switching circuitry between the sync events, and to turn on the AC mains switching circuitry during the sync events so as to allow for implementation of sync events without noticeable reduction in battery capacity. In another exemplary embodiment, the system side control circuitry may instruct the adapter side control circuitry to duty cycle the AC mains switching circuitry during reduced power states (e.g., such as non-operational host power states such as sleep) states in order to reduce the average AC power consumption during the reduced power states, e.g., to allow the DC-powered system to operate with a power consumption that is equal to or less than regulatory power consumption limits without design changes.

In one exemplary embodiment, when a DC-powered information handling system is in a reduced power state (e.g., non-operational host power state such as CS or AOAC) and between sync events, the primary side switcher circuitry of a connected AC-DC adapter may be turned off or put into a pulsed mode to get average power below 100 mw, and alternatively as low as 0 watts, between sync events. During sync events the primary side switcher circuitry of the connected AC-DC adapter may be turned on allowing for SYNC events without noticeable reductions in battery capacity.

In one respect, disclosed herein is a system, including: an AC-DC adapter system having AC primary side switcher circuitry and a DC secondary side that is configured to receive power from the AC primary side switcher circuitry and to produce a DC power output therefrom; and a DC-powered information handling system coupled by a DC power connection to receive DC power from the DC power output of the AC-DC adapter system. The DC-powered information handling system may itself include: a DC-powered system load, the system load being configured to operate in a first higher powered state and a second reduced power state, a battery system including one or more battery cells coupled to provide DC power to the system load, and at least one first processing device separate from the system load, the at least one first processing device being configured to operate when the system load is operating in the second reduced power state. The DC-powered information handling system may be configured to be coupled by a DC power connection to receive DC power from the AC-DC adapter system. The at least one first processing device of the DC-powered information handling system may be configured to command circuitry of an AC-DC adapter so as to enable operation of the AC primary side switcher circuitry when the DC-powered information handling system is operating in the first higher powered state and to disable or pulse operation of the AC primary side switcher circuitry when the DC-powered information handling system is operating in the second reduced powered state.

In another respect, disclosed herein is a DC-powered information handling system, including: a DC-powered system load, the system load being configured to operate in a first higher powered state and a second reduced power state; a battery system including one or more battery cells coupled to provide DC power to the system load; and at least one first processing device separate from the system load, the at least one first processing device being configured to operate when the system load is operating in the reduced power state. The DC-powered information handling system may be configured to be coupled by a DC power connection to receive DC power from an AC-DC adapter system having AC primary side switcher circuitry and a DC secondary side that receives power from the AC primary side switcher circuitry. The at least one first processing device of the DC-powered information handling system may be configured when coupled to the DC-powered information handling system to command circuitry of an AC-DC adapter so as to enable operation of the AC primary side switcher circuitry when the DC-powered information handling system is operating in the first higher powered state and to disable or pulse operation of the AC primary side switcher circuitry when the DC-powered information handling system is operating in the second reduced powered state.

In another respect, disclosed herein is a method of operating a DC-powered information handling system and an AC-DC adapter coupled to the DC-powered information handling system by a DC power connection, the method including: providing the AC-DC adapter system having AC primary side switcher circuitry and a DC secondary side; receiving power in the DC secondary side from the AC primary side switcher circuitry and producing a DC power output from the DC secondary side; and providing the DC-powered information handling system having a system load, a battery system including one or more battery cells coupled to provide DC power to the system load, and at least one first processing device separate from the system load, the DC-powered information handling system being coupled by the DC power connection to receive DC power from the DC power output across the DC power connection. The method may also include: operating the system load being in a first higher powered state and a second reduced power state; operating the at least one first processing device of the DC-powered information handling system when the system load is operating in the second reduced power state; and using the at least one first processing device of the DC-powered information handling system to command circuitry of the AC-DC adapter so as to enable operation of the AC primary side switcher circuitry when the DC-powered information handling system is operating in the first higher powered state and to disable or pulse operation of the AC primary side switcher circuitry when the DC-powered information handling system is operating in the second reduced powered state.

DESCRIPTION OF ILLUSTRATIVE EMBODIMENTS

Figure 1:
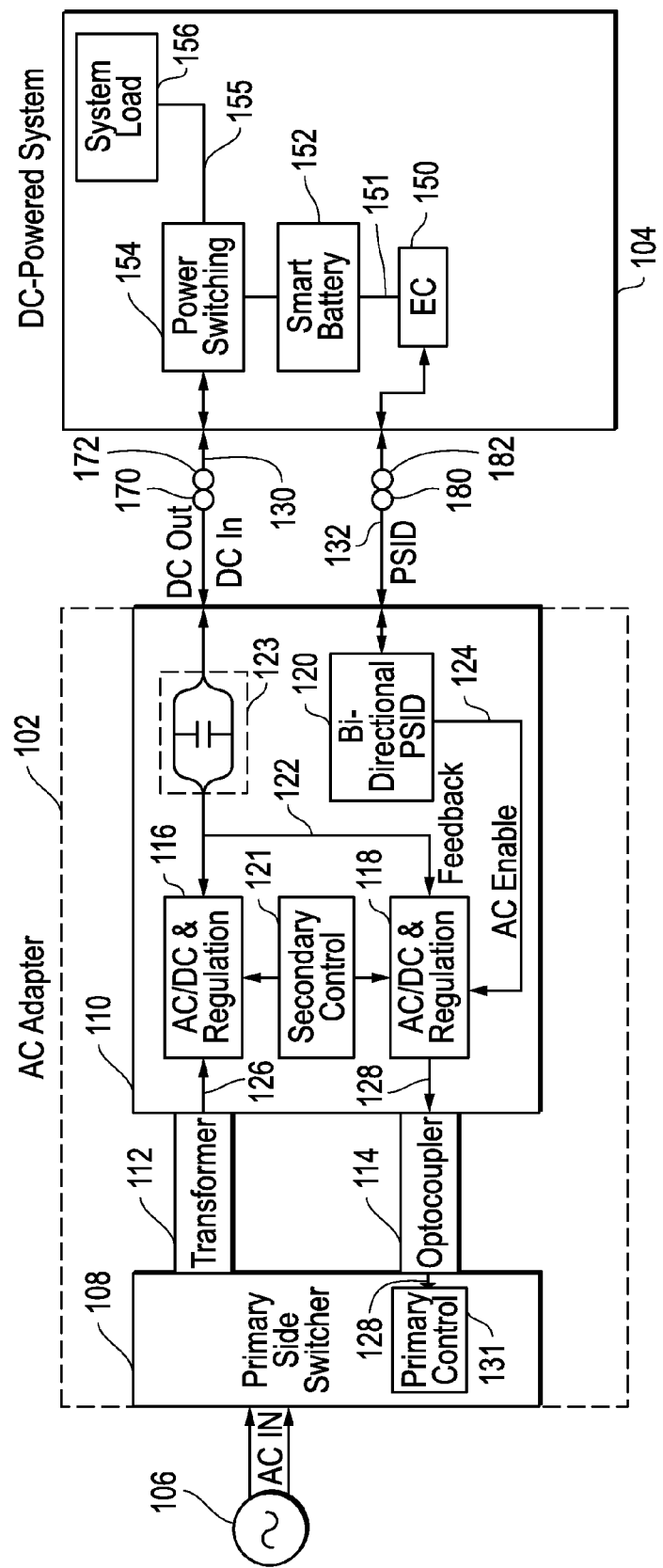
FIG. 1 is a simplified block diagram of an AC-DC adapter coupled to a DC-powered information handling system according to one exemplary embodiment of the disclosed systems and methods.

FIG. 1 illustrates a DC-powered information handling system 104 (e.g., such as a notebook computer, tablet or smart phone, etc.) that is coupled by a bidirectional DC power connection 130 to an AC-DC adapter system 102 according to one embodiment of the disclosed systems and methods. AC-DC adapter 102 is configured to receive AC mains power supply 106 and to convert the provided AC power to DC power that is provided to DC-powered information handling system 104 via DC power connection 130. In one exemplary embodiment, AC-DC adapter 102 may be configured to be removably and/or temporarily connected to supply DC power across DC power connection 130 to DC-powered information handling system 104, e.g., via a removable power plug interconnect 170 that mates with a corresponding power socket interconnect 172 of the DC-powered information handling system 104 or other suitable separable interconnection technology (e.g., such as induction power interconnect) that allows repeated coupling and decoupling or physical separation of the interconnects and power connection by a user. In one exemplary embodiment, system load of DC-powered information handling system 104 may be contained within a chassis enclosure, and circuitry of AC-DC adapter 102 may be contained within an adapter housing, e.g., such as a molded plastic enclosure.

In the illustrated embodiment of FIG. 1, DC-powered information handling system 104 includes a system load 156 (e.g., CPU and other optional processor/s, display, disk drive/s, wireless communication circuitry, etc.) that is powered by DC power provided through power switching circuitry from AC-DC adapter 102 and/or smart battery system 152. It will be understood that the disclosed systems and methods may be implemented with any type of information handling system or other device having a system load that is DC powered. Further information on exemplary components of a DC-powered information handling system may be found in U.S. patent application Ser. No. 13/495,631 filed Jun. 13, 2012, which is incorporated herein by reference in its entirety.

As shown in FIG. 1, AC-DC adapter 102 includes primary mains switcher circuitry 108 and secondary side circuitry 110. Primary mains switcher circuitry 108 is controlled by adapter primary controller circuitry 131 to control supply of AC current from AC mains power supply 106 (e.g., 110/120 or 220/240 AC volts or other AC mains voltage) to primary side of transformer circuitry 112. Transformer circuitry 112 includes primary and secondary side windings that provide voltage isolation between the primary and secondary sides as well as operate to provide a voltage step down (e.g., from 110/200 Volts to 19 Volts or other suitable step down voltage for system 104) for the secondary side power 126 that is provided to AC/DC and regulation circuitry 116. AC/DC and regulation circuitry 116 is in turn controlled by secondary controller circuitry 121 to perform the tasks of sensing output voltage and current and provide control information to the primary side in order to provide regulated DC output power 130 to power switching circuitry 154 of DC-powered information handling system 104. Secondary controller circuitry 121 is powered by DC output power 130 present on secondary (DC) side of transformer 112 and/or stored in capacitive filter element 123 at any given time.

Power switching circuitry 154 is coupled as shown to control flow of current between adapter 102, smart battery 152, and system load 156 of DC-powered information handling system 104. Specifically, power switching circuitry 154 may switch the system load 156 between DC output 130 of AC-DC adapter 102 and smart battery 152, e.g., according to whether or not DC output power 130 is currently available to power system load 156. Power switching circuitry 154 and/or logic within smart battery 152 (e.g., such as a battery management unit "BMU" that includes an analog front end "AFE" and microcontroller) may also be configured to provide available DC power from adapter DC output 130 to battery cells of smart battery 152 when needed. An embedded controller (EC) 150 running system firmware may also be provided and coupled by a data path 151 (e.g., a battery system data bus "SMBus") in this embodiment to smart battery pack 152 to receive battery state information, such as battery voltage and current information, from BMU circuitry within smart battery pack. EC 150 may also monitor voltage and/or current flow across DC power connection 130, e.g., through AFE and BMU of smart battery 152 or other suitable configuration of voltage and/or current monitoring circuitry.

Further information on BMU, battery pack system circuitry, battery charging/discharging operations, and DC-powered information handling systems may be found in U.S. Pat. No. 7,378,819, U.S. Pat. No. 7,391,184, U.S. Pat. No. 8,138,722, and in United States Patent Application Publication No. 20110248681, each of which is incorporated herein by reference in its entirety.

Referring in more detail to AC-DC adapter 102 of FIG. 1, a capacitive filter element 123 is coupled as shown between AC/DC and regulation circuitry 116 and adapter DC power output 130 to information handling system 104. In the illustrated embodiment, capacitive element 123 is the main output filter capacitor of the AC-Dc adapter 102, and energy stored by capacitive element 123 may be used as the energy source for maintaining output voltage during the intervals when energy is not being provided from the mains 106.

Circuitry of AC-DC adapter 102 also includes bi-directional power supply identifier (PSID) circuitry 120 that is coupled via PSID data channel 132 to embedded controller 150 of information handling system 104. Among other things, such a PSID channel may be provided for purposes of communicating attributes of AC-DC adapter 102 across PSID data channel 132 to DC-powered information handling system 104, e.g., such as power type (e.g., AC or DC), wattage/voltage/current rating, peripheral manufacturer, part number, country of origin and similar others. It will be understood that PSID data channel 132 may be a dedicated PSID data signal conductor, or may be any other communication medium (e.g., such as a signal or power line) that is suitable for communicating PSID information and/or other information between AC-DC adapter 102 and DC-powered information handling system 104 as described herein. Interconnection for PSID data channel 132 between AC-DC adapter 102 and DC-powered information handling system 104 may in one embodiment be accomplished via mating socket and plug interconnects 180, 182 or other separable mating technology between the two separate components 102 and 104. Further information on PSID functionality may be found, for example, in U.S. Pat. No. 7,392,410, which is incorporated herein by reference in its entirety.

Still referring to FIG. 1, AC-DC adapter 102 includes AC/DC & regulation circuitry 118 that is controlled by secondary controller circuitry 121 and that is coupled to receive and monitor DC voltage present on the secondary (DC) side of transformer 112, and that is also coupled as shown to receive an AC enable signal 124 from bi-directional PSID circuitry 120. It will be understood that secondary controller circuitry 121, primary controller circuitry 131, and/or PSID circuitry 120, may each be implemented separately or together by a processing device, e.g., such as processor, microprocessor, controller, microcontroller, FPGA, ASIC, etc. that is programmed to perform the indicated tasks described herein.

AC/DC & regulation circuitry 118 may also coupled as shown to provide an optical switcher control signal 128 across an optoisolator 114 or other type of voltage isolation barrier to control operation of primary side switcher circuitry 108 of AC-DC adapter 102, e.g., to turn primary side switcher circuitry 108 on and off in real time in response to current condition of AC enable signal 124 received from PSID circuitry 120. Secondary side circuitry 110 may also provide output sense of the secondary voltage of DC output 130 (e.g., sensed from output feedback voltage sense line 122) and send command/control information over optoisolator 114 to the primary side switcher circuitry 108 to maintain the DC output 130 in the desired voltage range, e.g., such as using an On/Off signal transmitted to adapter primary controller circuitry 131 of primary side switcher circuitry 108 which is duty cycle controlled in such a manner so as to achieve the desired output voltage.

It will be understood that the illustrated embodiment of AC-DC adapter 102 is exemplary only, and that any other type of voltage isolation barrier may be employed that is suitable for communicating a switcher control signal 128 from secondary (DC) side of an AC-DC adapter 102 to primary (AC) side of AC-DC adapter 102, e.g., such as transformer isolation barrier. It will also be understood that operation of primary side switcher circuitry 108 may be controlled by at least one processing device (e.g., processor, microprocessor, controller, microcontroller, etc.) provided on the primary side of AC-DC adapter 102 that is coupled to receive the switcher control signal 128 across the isolation barrier, and to respond to the switcher control signal by controlling operation of primary switcher side circuitry 108, e.g., by enabling or disabling switching operations of the switcher side circuitry 108 to turn it on or off, respectively. As will be further described herein, DC-powered information handling system 104 may be configured to selectively provide DC power back to AC-DC adapter 102, e.g., to charge and recharge capacitive filter element 123 and provide power to secondary controller circuitry 121 during periods of time that primary mains switcher circuitry 108 is turned off or disabled in response to switcher control signal 128 received from AC/DC and regulation circuitry 118.

As will be further described herein, the disclosed systems and methods may be implemented in one exemplary embodiment to employ PSID data channel 132 as a data path for communicating an adapter operation command signal from DC-powered information handling system 104 to AC-DC adapter 102 when DC-powered information handling system 104 enters a reduced power state. For example, conventional AC-DC adapters sense an open circuit on pin of PSID channel 132 and system load is below an existing low voltage threshold. In such a case, DC-powered information handling system 104 may be configured to include a series transistor or other suitable switching element in the PSID communication line 132 which may be controlled by embedded controller (EC) 150, e.g., to open the PSID series transistor or switching element to selectably create an open circuit in the PSID line so as to command AC-DC adapter 102 to enter the low power mode and thus turn off the primary switcher circuitry 108 to allow the DC output voltage 130 to droop. Such an embodiment may be employed with (and is backwards compatible with) conventional off the shelf (COTS) low power adapters that include indicated functionality to implement low power operating modes. In such a case, the AC-DC adapter 102 may use its existing low voltage threshold for enabling primary switcher circuitry 108. When no current is provided from DC-powered information handling system 104 to AC-DC adapter system 102, this may result in a pulsed (saw tooth) waveform on the DC output 130 of the AC-DC adapter 102.

However, in other embodiments described herein, DC-powered information handling system 104 may provide power to secondary controller 121 of AC-DC adapter system 102 during times that primary switcher circuitry 108 is "off", in which case the DC output 130 may be maintained above the low voltage threshold of the AC-DC adapter system 102 such that primary switcher circuitry 108 remains continuously off during this time. In either case, once embedded controller 150 detects that DC-powered information handling system 104 desires or is otherwise ready to enter a higher powered operating state, embedded controller 150 may close the PSID series transistor or switching element to selectably close the circuit in the PSID line so as to command AC-DC adapter 102 to enter normal operating mode and thus turn on the primary switcher circuitry 108 to allow DC output voltage 130 to rise to normal level.

However, it will be understood that any other suitable type of wired or wireless data communication path or medium (e.g., two-way digital data communication path such as data bus, one or more conductive signal lines, Wi-Fi, Bluetooth, near field wireless communication, etc.) may alternatively be employed to directly communicate adapter operation digital data command signals from processing device/s of DC-powered information handling system 104 to processing device/s of AC-DC adapter 102. For example, embedded controller (EC) 150 of DC-powered information handling system 104 may be configured to send an explicit data command to AC-DC adapter 102 (e.g., such as to secondary controller circuitry 121) that explicitly commands the secondary controller circuitry 121 to disable or to pulse the primary switcher circuitry 108 when EC 150 detects that DC-powered information handling system 104 enters a reduced power state.

Upon receipt by secondary controller 121 of such an explicit data command signal from EC 150, primary switcher circuitry 108 may be turned "off" (i.e., when DC power is to be provided from battery system 152 of DC-powered information handling system 104 during system reduced power state), or may be pulsed in saw tooth pattern as described herein (i.e., when no DC power is available to be provided to AC-DC adapter 102 from DC-powered information handling system 104). In either case embedded controller (EC) 150 of DC-powered information handling system 104 may be configured to send another explicit data command to secondary control circuitry 121 of AC-DC adapter 102 when DC-powered information handling system 104 desires to enter a higher (e.g., normal operating) powered state to explicitly command AC-DC adapter 102 to enter normal operating mode and thus turn on the primary switcher circuitry 108 to allow DC output voltage 130 to rise to normal level. In such an exemplary embodiment AC-DC adapter 102 may be configured to output the lowest voltage that AC-DC adapter 102 can support while still keeping secondary control circuitry 121 alive, which may be potentially lower than current conventional COTS AC-DC adapters.

It will also be understood that in other embodiments, other types of data signaling modes may be implemented to allow a processing device of a DC-powered information handling system 104 to communication with and command a secondary controller 121 of an AC-DC adapter to control its primary side switching circuitry 108 as directed based on current system power state. For example, in the case of a two-wire configuration (i.e., having no separate PSID or other type of data communication path between AC-DC adapter 102 and DC-powered information handling system 104), signal modulation techniques may be employed to communicate data and command signals between AC-DC adapter 102 and DC-powered information handling system 104. Such signal modulation techniques include, but are not limited to, AC modulation of the DC power line 130, modulation of the system load requirement by the DC-powered information handling system 104 (e.g., by forcing load current to go above and below certain thresholds at a given duty cycle a specific number of times or in a specific sequence), and/or voltage modulation by AC-DC adapter 102 and/or DC-powered information handling system 104. In yet another embodiment, EC 150 may command secondary control circuitry 121 to turn primary switcher circuitry 108 back on by raising the voltage being held by the DC-powered information handling system 104 on DC power output 130 to a value that is above a pre-selected threshold when EC 150 determines that DC-powered information handling system 104 desires to transition back from a reduced power state to a higher power state.

Figure 2:
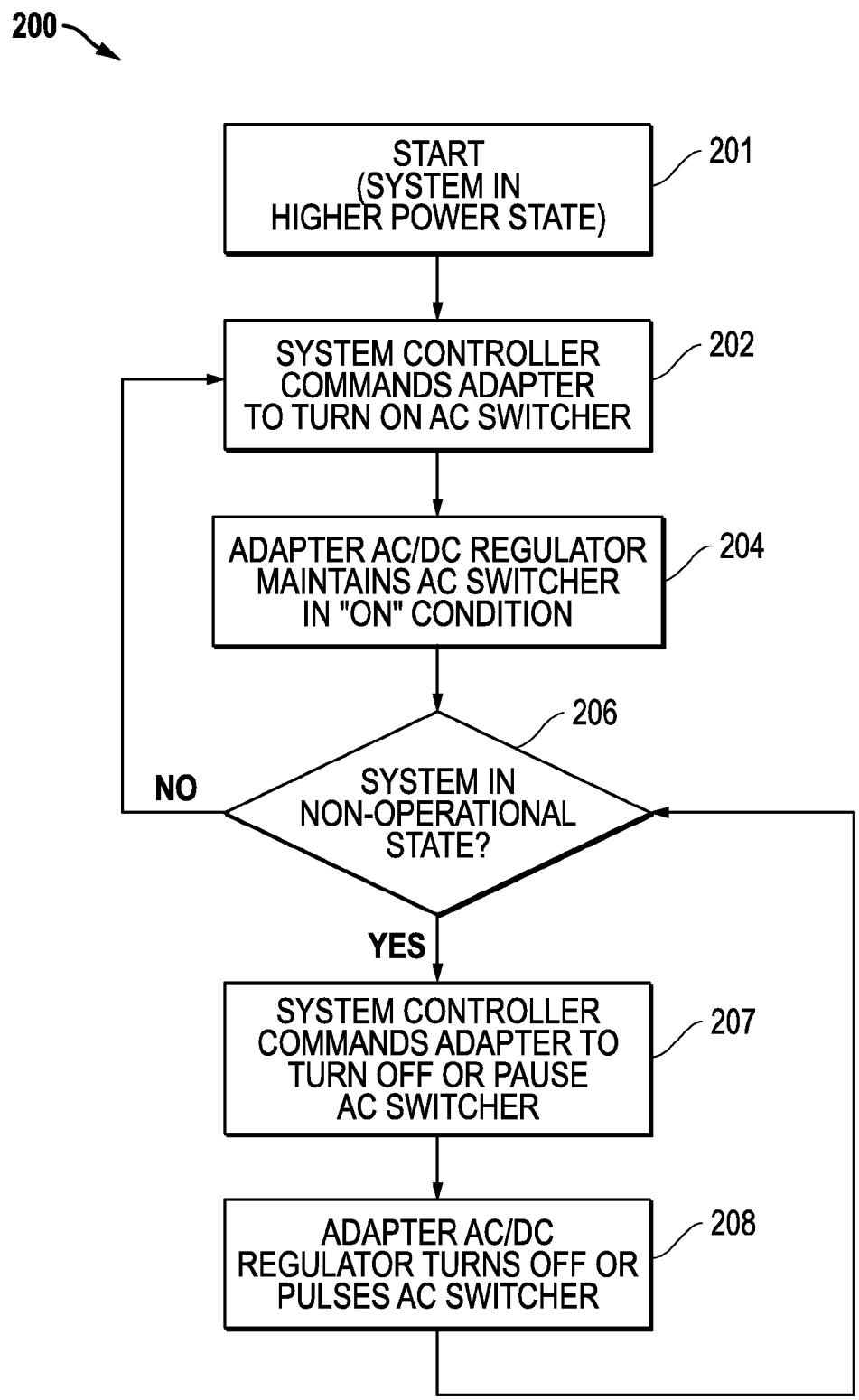
FIG. 2 illustrates methodology according to one exemplary embodiment of the disclosed systems and methods.

FIG. 2 illustrates one exemplary embodiment of a methodology 200 that may be implemented to control AC mains switching circuitry of an AC-DC adapter by a coupled DC-powered system (e.g., using coupled DC-powered information handling system 104 and AC-DC adapter 102 of FIG. 1), and all steps of methodology 200 may be implemented in one embodiment while DC-powered information handling system 104 remains coupled to active (AC mains powered) AC-DC adapter 102. In this regard, methodology 200 will be described herein with reference to the embodiment of FIG. 1, it being understood that methodology 200 may be similarly implemented with other configurations of DC-powered information handling systems having one or more processing devices configured to monitor and/or control system operational state and other configurations of AC-DC adapters having one or more processing devices configured to control AC primary side switcher circuitry in response to command signals received from a coupled DC-powered information handling system. Moreover, although described further herein for the exemplary embodiment where a reduced power state is a non-operational host power state, it will be understood that the disclosed systems and methods may be similarly implemented for other types of reduced power states in which a host processing device of a DC-powered information handling system remains active and/or for other system embodiments such as DC-powered information handling systems having a system load that does not include a host processing device configured to execute an operating system.

As shown in FIG. 2, methodology 200 starts in step 201 with DC-powered information handling system 104 coupled to receive DC power from AC-DC adapter 102, and with DC-powered information handling system 104 operating in a higher power state, e.g., such as an operating host power state like ACPI G0 (S0) working state or a fully operational power state in which a host processing device of the DC-powered information handling system remains active and is executing an operating system or other instructions, e.g., with adapter primary side switcher circuitry 108 on. In step 202, system embedded controller 150 monitors current operating state of DC-powered information handling system and responds to the higher power system operating state by providing an AC mains switcher "ON" command signal to bi-directional PSID circuitry 120 across PSID data channel 132, e.g., by using a switching element to close the circuit of PSID data channel 132 as previously described. It will also be understood that in one embodiment, system embedded controller 150 may be additionally configured to monitor sources of system input (e.g., such as power switch, wake timer, etc.) that may cause the system 104 to enter a higher power state, and to respond to input activity on such system input sources by transmitting an AC mains switcher "ON" command signal to command the AC-DC adapter 102 to turn on primary switcher circuitry 108 prior to the system entering the higher power state.

In the illustrated embodiment, PSID circuitry 120 receives and interprets the AC mains switcher "ON" command, and responds to receipt of the AC mains switcher "ON" signal by providing an AC enable signal 124 to AC/DC & regulation circuitry 118. AC/DC & regulation circuitry 118 in turn responds to receipt of the AC enable signal 124 in step 204 by transmitting an optical switcher control signal 128 across optoisolator 114 to instruct adapter primary controller circuitry 131 to maintain adapter primary switcher circuitry 108 in enabled or "on" condition for as long as DC-powered information handling system 104 remains in the higher power operating state, e.g., system embedded controller 150 continues monitoring the current system operating power state of DC-powered information handling system 104 in step 206 and returns and repeats steps 202 to 206 for as long as DC-powered information handling system 104 remains in the higher power operating state.

It will be understood that FIG. 2 is exemplary only, and that system embedded controller 150 may communicate an AC mains switcher "ON" or "OF" command signal to AC-DC adapter 102 in different ways depending on the particular implementation of system 104 and/or AC-DC adapter 102. For example, if the AC mains switcher command signal effects an operating state change (i.e., indicating transition between a low power operating mode and normal operating mode) then it such a command signal may need only to be sent once. However, it is alternatively possible in another embodiment that system embedded controller 150 may periodically check system operation and send repeated or continuous AC mains switcher "ON" (and/or "OFF") command signals based upon the results of each periodic system check.

Still referring to the exemplary embodiment of FIG. 2, when system embedded controller 150 determines in step 206 that DC-powered information handling system 104 is either about to enter (or alternatively has already entered) a non-operational host power state that may include a reduced system load state or a system no load state. In one exemplary embodiment, system embedded controller 150 may initiate and/or participate in transitioning of system 104 between different power states (e.g., non-operational power state, higher power state, etc.). In such an embodiment, system controller 150 generally has prior knowledge of system state transitions so determination of a system state transition may occur prior to as well as after the actual system state transition. In one embodiment, when transitioning from higher power to lower power state, system embedded controller 150 may wait on the system to achieve the lower power state before it transmits an AC mains switcher "OFF" command signal to the AC-DC adapter 102 to turn off the primary side switcher circuitry 108.

With regard to step 206, examples of non-operational host power states include, but are not limited to, sleeping, "soft off" or "mechanical off" states, such as ACPI G1 sleeping states S1, S2, S3, S4; G2 "soft off" state S5; G3 "mechanical off" state; Microsoft Windows connected standby (CS) and always on always connected (AOAC) states, etc. When EC 150 determines the existence of such a state in step 206, then methodology 200 proceeds to step 207 in which system embedded controller 150 provides an AC mains switcher "OFF" command (or AC mains switcher "PULSE" command) to bi-directional PSID circuitry 120 across PSID data channel 132, e.g., by transmitting a specific command data signal across a bi-directional PSID data channel 132, by controlling a switching element to open the circuit of the PSID data channel 132 or alternatively a uni-directional PSID data channel of a legacy AC-DC adapter, or using any other suitable command transmittal technique. In the illustrated embodiment, PSID circuitry 120 receives and interprets the AC mains switcher "OFF" (or "PULSE") command, and responds to receipt of this command signal by discontinuing (or selectively pulsing) the AC enable signal 124 to AC/DC & regulation circuitry 118. AC/DC & regulation circuitry 118 in turn responds to absence (or pulsing) of the AC enable signal 124 in step 208 by transmitting a corresponding optical switcher control signal 128 across optoisolator 114 to adapter primary controller circuitry 131 to instruct adapter primary controller circuitry 131 to turn off (or pulse) adapter primary side switcher circuitry 108 for as long as DC-powered information handling system 104 remains in the a non-operational host power state, e.g., system embedded controller 150 returns to step 206 to monitor the current system operating power state of DC-powered information handling system 104 and repeats steps 206 to 208 for as long as DC-powered information handling system 104 remains in the a non-operational host power state, and only returns to step 202 when embedded controller 150 determines that DC-powered information handling system needs to return to a higher powered or working operational state.

Figure 3:
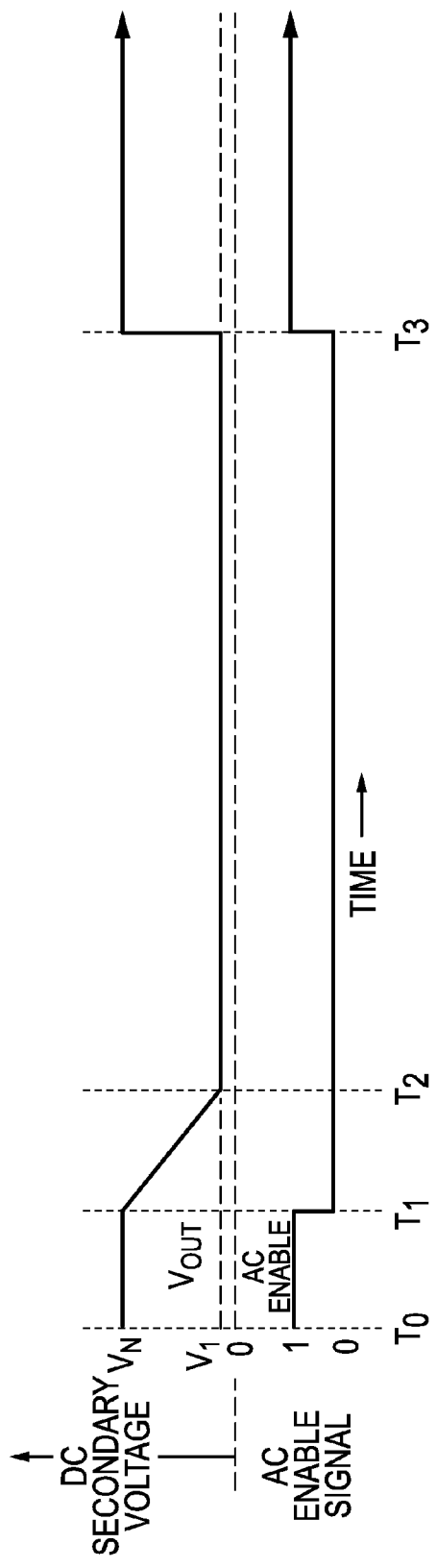
FIG. 3 illustrates adapter control behavior according to one exemplary embodiment of the disclosed systems and methods.
Figure 4:
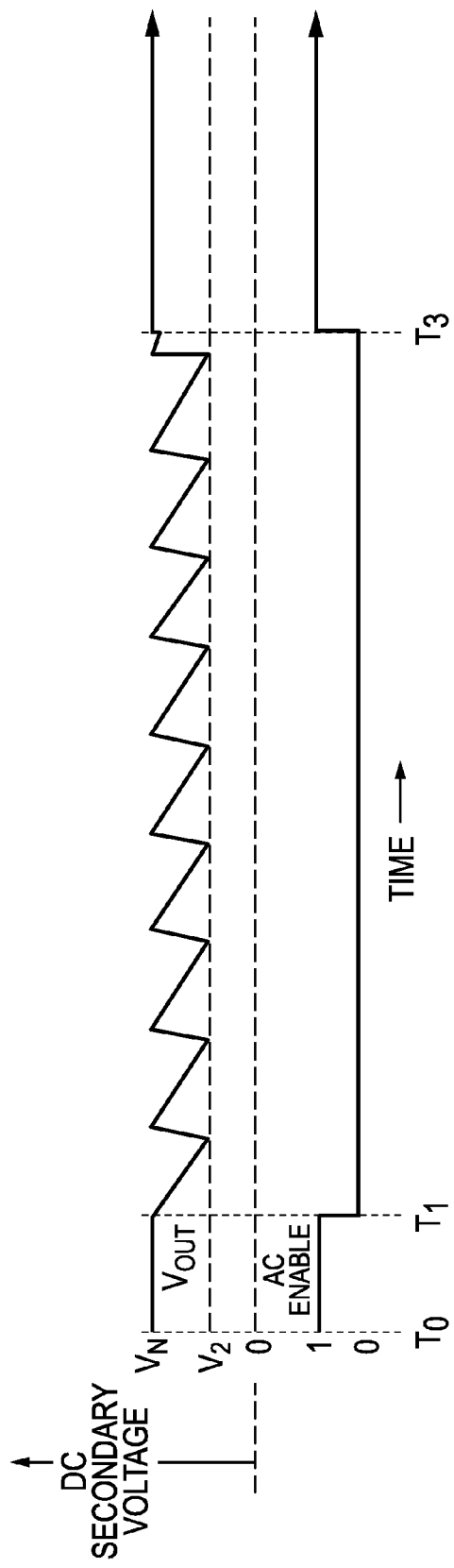
FIG. 4 illustrates adapter control behavior according to one exemplary embodiment of the disclosed systems and methods.

FIGS. 3 and 4 illustrate two possible different embodiments of adapter primary side control behavior that may be utilized, e.g., during steps 206 to 208 of methodology 200 of FIG. 2. In the exemplary embodiment of FIG. 3, a DC-powered information handling system may disable or otherwise turn off adapter primary side switcher circuitry of a coupled AC-DC adapter for the duration of those times that the coupled DC-powered information handling system is operating in a non-operational host power state (such as previously described), while at the same time DC power is provided from the DC-powered information handling system to the AC-DC adapter during these times to power secondary controller circuitry of the AC-DC adapter. In the exemplary embodiment of FIG. 4, a DC-powered information handling system may pulse adapter primary side switcher circuitry of a coupled AC-DC adapter on and off in a saw tooth manner for the duration of those times that a coupled DC-powered information handling system is operating in a non-operational host power state in order to ensure sufficient DC power (e.g., about 15 to about 20 milliwatts or other suitable reduced power level) or voltage is available on the secondary side of the AC-DC adapter during these times to power secondary controller circuitry and/or other secondary side circuitry (e.g., such as LED indicator) of the AC-DC adapter. In FIG. 4, it is possible that no DC power may be provided from the DC-powered information handling system to power the secondary controller circuitry of the AC-DC adapter during the duration of a non-operational host power state of the DC-powered information handling system.

For purposes of illustration only, FIGS. 3 and 4 are described herein with reference to the exemplary embodiment of FIG. 1, it being understood that adapter primary side control behavior of FIGS. 3 and 4 may be similarly implemented with other configurations of DC-powered information handling systems having one or more processing devices configured to monitor and/or control system operational state and other configurations of AC-DC adapters having one or more processing devices configured to control AC primary side switcher circuitry in response to command signals received from a coupled DC-powered information handling system. Moreover, it will be understood that a processing device (e.g., embedded controller 150) of a DC-powered information handling system may be configured to monitor battery system capacity of a DC-powered information handling system and to select in real time between the embodiments of FIG. 3 and FIG. 4 for powering secondary controller circuitry of a coupled AC-DC adapter during system reduced power state based on the monitored real time charge capacity of the battery cells of the DC-powered information handling system, e.g., the embodiment of FIG. 3 may be selected when cells of battery system 152 are presently charged above a minimum battery capacity threshold that is sufficient to power secondary controller circuitry of the AC-DC adapter, whereas the embodiment of FIG. 4 may be selected when cells of battery system 152 are not presently charged above a minimum battery capacity threshold that is sufficient to power secondary controller circuitry of the AC-DC adapter.

In the exemplary embodiment of FIG. 3, DC-powered information handling system 104 is coupled to receive DC power from AC-DC adapter 102 and is operating in a higher powered state from time $T_0$ to time $T_1$, during which AC enable signal 124 remains high, and primary side switcher circuitry 108 is correspondingly controlled to remain "on" to supply the adapter DC output voltage at a continuous full normal operating voltage $V_N$ (e.g., about 19 volts) as shown to provide normal operating power (e.g., such as about 12 to 60 watts or other suitable power for a given circuitry configuration). At time $T_1$ of FIG. 3, DC-powered information handling system 104 enters a non-operational host power state and accordingly AC enable signal 124 becomes low at $T_1$ as shown, which in turn causes primary side switcher circuitry 108 to be disabled or "off" and the DC output voltage to leak off at time $T_2$ as shown. During the duration of the time that AC enable signal 124 remains low and primary side switcher circuitry 108 is disabled (i.e., from time $T_1$ to time $T_3$), embedded controller 150 of DC-powered information handling system 104 controls smart battery 152 and power switching circuitry 154 to provide DC current from DC-powered information handling system 104 to AC-DC adapter 102 across bidirectional DC power connection 130. In this way, DC power from DC-powered information handling system 104 may be configured to maintain a first minimum voltage threshold $V_1$ (e.g., such as about 5 volts or other suitable greater or lesser voltage level) that is selected to be sufficient to power operation of adapter secondary controller 121 while adapter primary side switcher circuitry 108 is disabled and producing no power. Thus, during the time $T_1$ to time $T_3$, no AC mains current 106 is consumed by AC-DC adapter 102. At time $T_3$, AC enable signal 124 goes high to cause primary side switcher circuitry 108 to transition to "on" to return the DC output voltage to full non-zero operating voltage $V_N$ as shown prior to DC-powered information handling system 104 again entering a higher powered operating state.

In the exemplary embodiment of FIG. 4, DC-powered information handling system 104 is coupled to receive DC power from AC-DC adapter 102 and is operating in a higher powered state from time $T_0$ to time $T_1$, during which AC enable signal 124 remains high, and primary side switcher circuitry 108 is correspondingly controlled to remain "on" to maintain the adapter DC output voltage at a continuous full non-zero normal operating voltage $V_N$ as shown. At time $T_1$ of FIG. 3, DC-powered information handling system 104 enters a non-operational host power state and accordingly AC enable signal 124 becomes low at $T_1$ as shown, which in turn causes primary side switcher circuitry 108 to be pulsed on and off during the duration of the time that AC enable signal 124 remains low (i.e., from time $T_1$ to time $T_3$) between $V_N$ and a second minimum voltage threshold $V_2$ level (e.g., about 6 to 12 volts) which is selected to recharge output capacitive element 123 to provide average power from smart battery 152 that is sufficient to power secondary controller circuitry 121 while primary side switcher circuitry 108 is pulsed on and off. Thus, during the time $T_1$ to time $T_3$, a reduced amount of AC mains current 106 is consumed by AC-DC adapter 102. At time $T_3$, after determining the need to transition DC-powered information handling system 104 into a higher powered operating state EC 150 asserts AC enable signal 124 high to cause primary side switcher circuitry 108 to transition to "on" to return the adapter primary side voltage to continuous full non-zero operating voltage $V_N$ after which the DC-powered information handling system 104 then transitions into a higher powered operating state.

Figure 5:
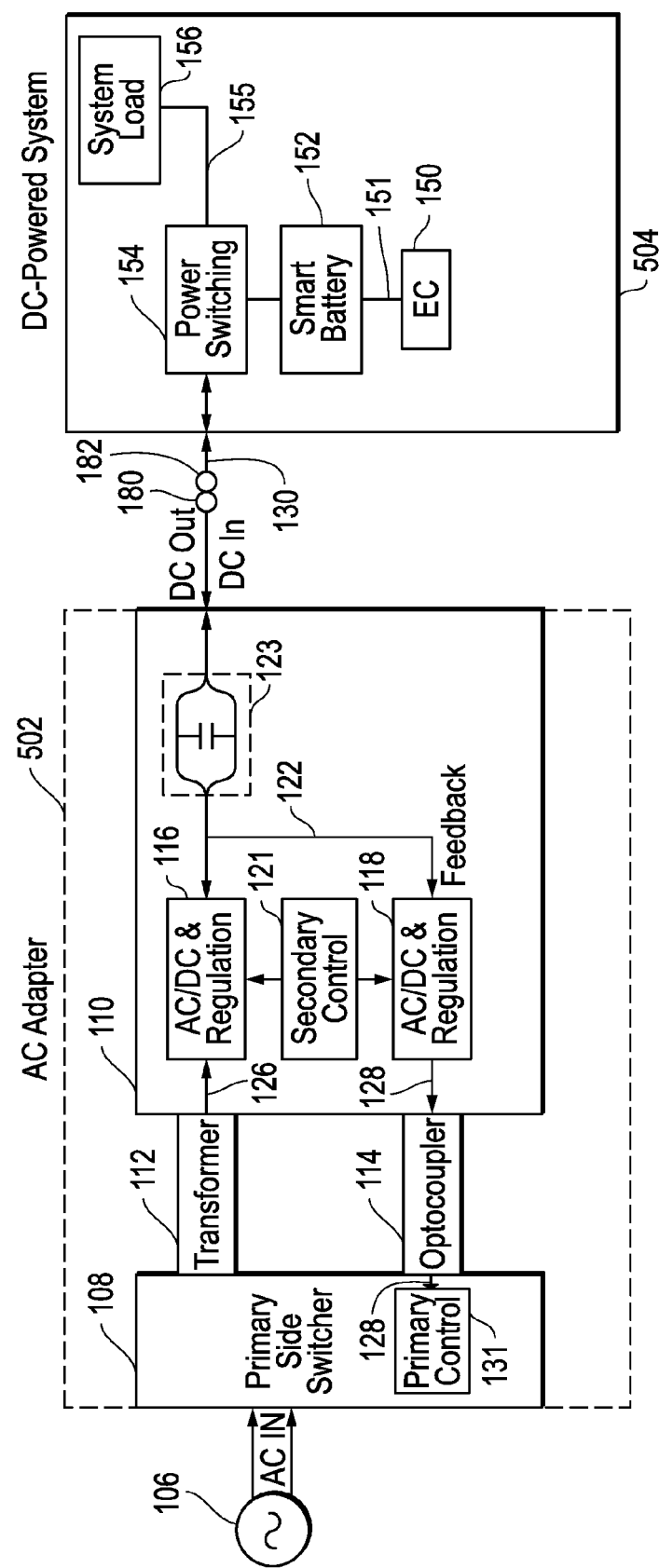
FIG. 5 is a simplified block diagram of an AC-DC adapter coupled to a DC-powered information handling system according to one exemplary embodiment of the disclosed systems and methods.

FIG. 5 illustrates a DC-powered information handling system 504 (e.g., such as a notebook computer, tablet or smart phone, etc.) that is coupled by a bidirectional DC power connection 130 to an AC-DC adapter 502 according to another exemplary embodiment of the disclosed systems and methods. AC-DC adapter 502 and DC-powered information handling system 504 of FIG. 5 are similarly configured as AC-DC adapter 102 and DC-powered information handling system 104 of FIG. 1, with the exception that circuitry of AC-DC adapter 502 does not include a PSID data channel or other separate communication path for communicating an adapter operation command signal from DC-powered information handling system 104 to AC-DC adapter 102.

Figure 6:
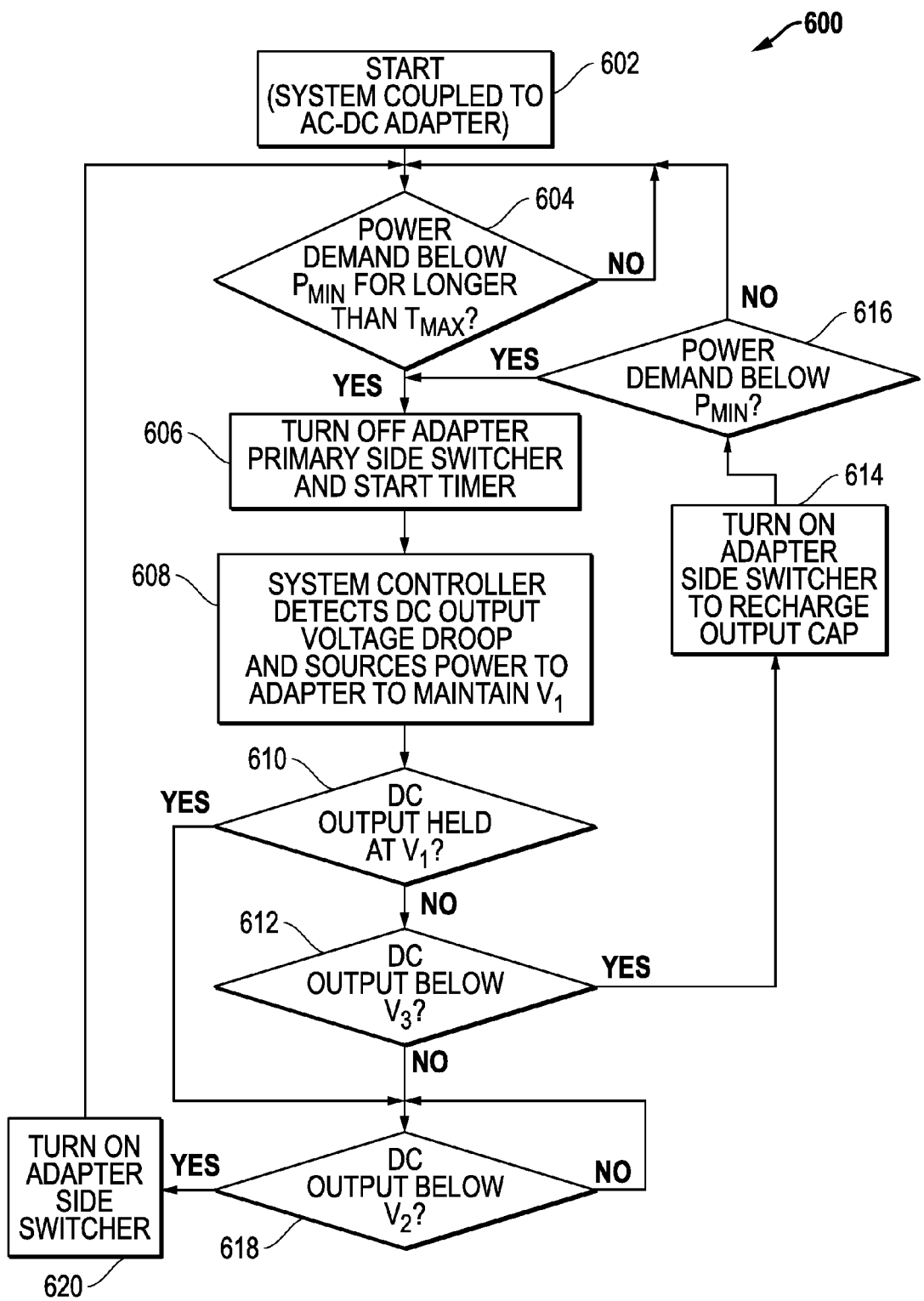
FIG. 6 illustrates methodology according to one exemplary embodiment of the disclosed systems and methods.
Figure 7:
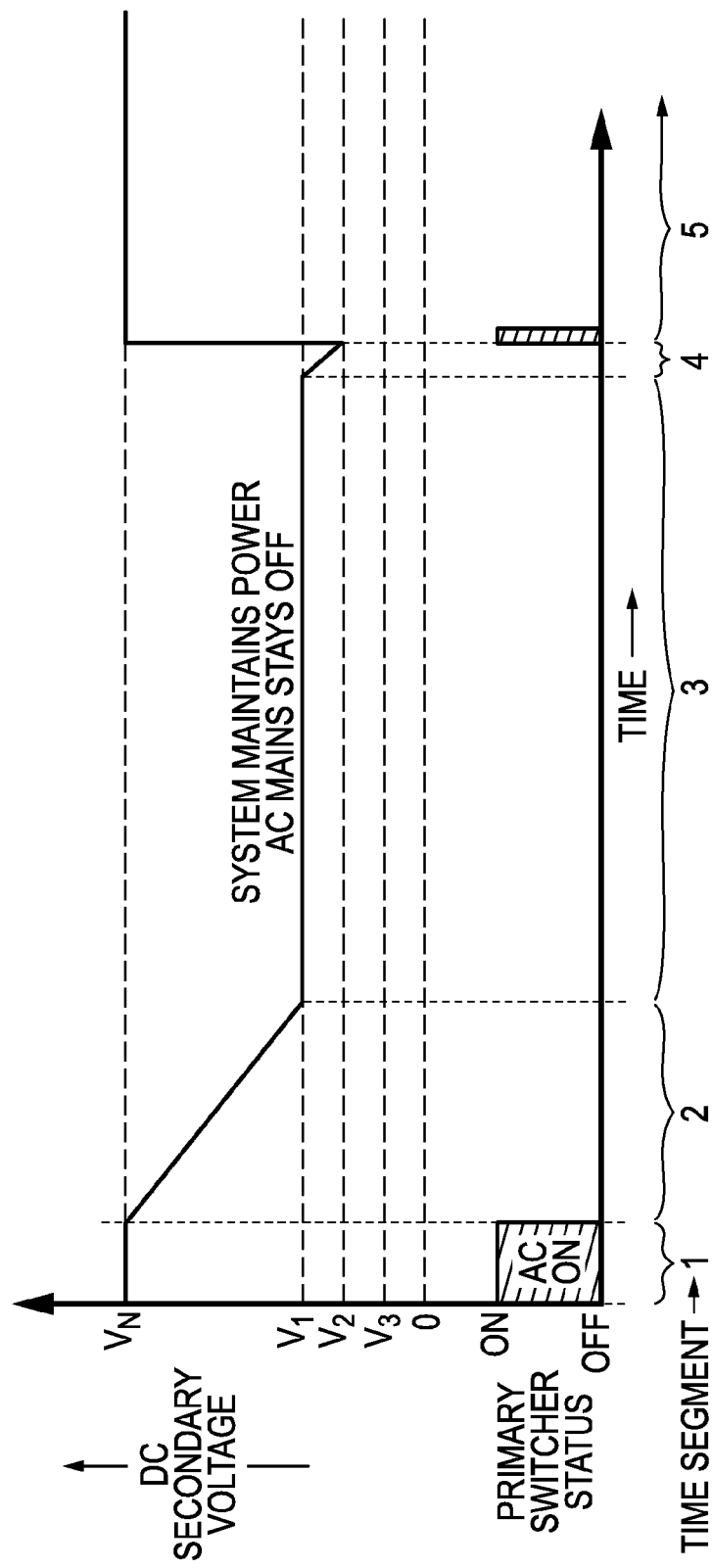
FIG. 7 illustrates adapter control behavior according to one exemplary embodiment of the disclosed systems and methods.
Figure 8:
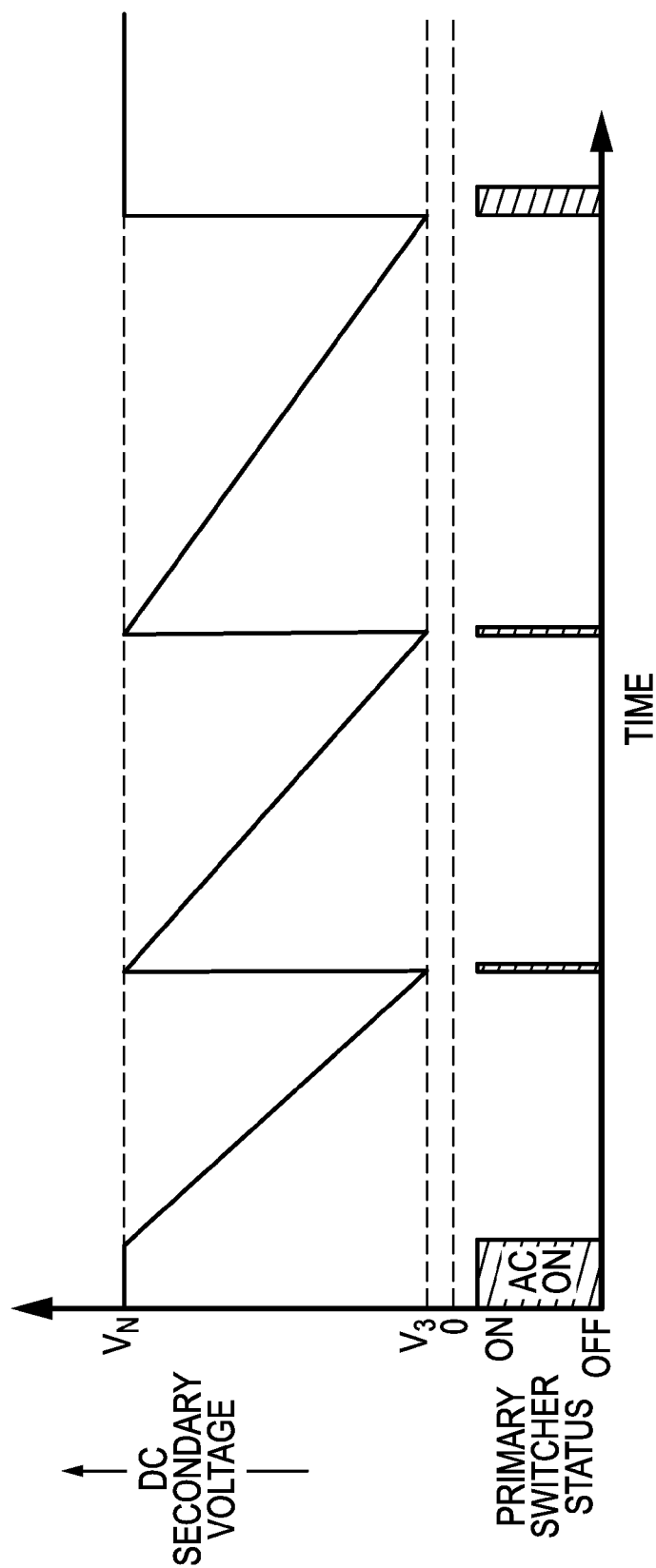
FIG. 8 illustrates adapter control behavior according to one exemplary embodiment of the disclosed systems and methods.

FIG. 6 illustrates one exemplary embodiment of a methodology 600 that may be implemented to allow a DC-powered system to at least partially control AC mains switching circuitry of a coupled AC-DC adapter without using an explicit adapter operation command signal provided from the DC-powered information handling system to the connected AC-DC adapter, e.g., such as is the case with the exemplary embodiment of FIG. 5 where no data path is available for transmittal of such a command signal. All steps of methodology 600 may be implemented in one embodiment while DC-powered information handling system 104 remains coupled to active (AC mains powered) AC-DC adapter 102. Methodology 600 will be described herein with reference to the coupled adapter/system embodiment of FIG. 5, it being understood that methodology 600 may be similarly implemented with other configurations of DC-powered information handling systems having one or more processing devices configured to monitor and/or control system operational state and other configurations of AC-DC adapters having one or more processing devices configured to control AC primary side switcher circuitry in response to DC output voltage from the AC-DC adapter. FIG. 6 will also be described with reference to the exemplary relationships of DC secondary output voltage versus time that are illustrated in FIGS. 7 and 8.

As shown, methodology 600 starts in step 602 with DC-powered information handling system 504 coupled to receive DC power from AC-DC adapter 502, and with adapter primary side switcher circuitry 108 in the "on" condition and operating to supply power to transformer 112 of AC-DC adapter 502. This maintains a normal operating voltage $V_N$ (e.g., such as about 19 volts) on DC power interconnection 130 and keeps output capacitive element 123 charged. This condition is illustrated by time segment 1 of FIG. 7.

In step 604, secondary controller circuitry 121 of AC-DC adapter 502 (e.g., provided with analog front end for this purpose) monitors DC output power connection 130 to determine current real time DC power demand from DC-powered information handling system 504, which is indicative of the current power state of DC-powered information handling system 504. Secondary controller 121 uses this monitored DC power demand to determine if the output power demand on DC output power connection 130 has dropped below a minimum operating power threshold ($P_{MIN}$) for longer than a maximum lower power threshold operating time ($T_{MAX}$). In this embodiment, $P_{MIN}$ may be selected to correspond to and be indicative of one or more particular non-operational host power states of DC-powered information handling system 504 (e.g., such as ACPI G1, G2, G3 and/or Windows CS or AOAC states), and $T_{MAX}$ may be selected, for example, based on timing capabilities in system 504 and AC-DC adapter 502, along with expected normal operating modes of system. As an example only, $P_{MIN}$ may be selected to be about 0.05 watts, and $T_{MAX}$ may be selected to be about 20 seconds, it being understood that greater and lesser values of $P_{MIN}$ and/or $T_{MAX}$ may be employed, respectively. In one exemplary embodiment, system side embedded controller 150 may selectively control or vary DC power demand across DC output power connection 130 from system 504 in order to command circuitry of AC-DC adapter 502 to turn off primary side switcher circuitry 108 using the criteria of steps 604 and 606 described below. System side embedded controller 150 may also selectively control or vary DC power demand across DC output power connection 130 from system 504 in order to command circuitry of AC-DC adapter 502 to perform various operations according to the other steps of FIG. 6.

If it is determined in step 604 that the output power demand on DC output power connection 130 has not dropped below $P_{MIN}$ for longer than $T_{MAX}$ then this is indicative that DC-powered information handling system is operating in a higher powered operating state and step 604 repeats again as shown, with primary side switcher circuitry 108 continuing to operate in the "on" condition. However, once secondary controller circuitry 121 of AC-DC adapter 502 determines in step 604 that output power demand on DC output power connection 130 has dropped below $P_{MIN}$ for longer than $T_{MAX}$ (i.e., indicating that DC-powered information handling system 504 has entered a non-operational host power state), then methodology 600 proceeds to step 606 where secondary controller circuitry 121 causes AC/DC & regulation circuitry 118 to transmit an optical switcher control signal 128 across optoisolator 114 to adapter primary controller circuitry 131 to instruct adapter primary controller circuitry 131 to turn adapter primary side switcher circuitry 108 "off". At the same time, secondary controller 121 may in one exemplary embodiment start a timer for purposes of determining whether or not output voltage on DC power connection 130 is maintained at first minimum voltage threshold $V_1$ by information handling system 504 in step 610 described below. As soon as adapter primary side switcher circuitry 108 is turned "off", voltage on DC output connection 130 begins to drop, e.g., at least partially due to power drain from DC-powered information handling system 504 while in a power-consuming a non-operational host power state. This condition is indicated by time segment 2 in FIG. 7.

Next, in step 608, system side embedded controller 150 monitors output voltage on DC power connection 130 and therefore detects the drop in output voltage on DC power connection 130 that is caused when primary side switcher circuitry 108 is turned off in step 606. When embedded controller 150 detects that output voltage on DC power connection 130 has dropped from normal operating voltage $V_N$ (e.g., such as about 19 volts or any other suitable greater or lesser normal operating voltage value) to a first minimum voltage threshold $V_1$, embedded controller 150 responds by controlling system side power switching circuitry 154 to provide power from smart battery 152 to secondary side of AC-DC adapter 502 through DC power connection 130 in order to maintain the first minimum voltage threshold $V_1$ on DC power connection 130, as indicated by time segment 3 in FIG. 7. In this regard, first minimum voltage threshold $V_1$ is selected to be a voltage that is sufficient to power operation of adapter secondary controller 121 while adapter primary side switcher circuitry 108 is not operating, e.g., $V_1$ may be about 5 volts in one exemplary embodiment, or may be any other suitable greater or lesser voltage level.

As shown in step 610, adapter secondary controller 121 monitors voltage on DC power connection 130 after step 608 to ensure there is sufficient power provided from smart battery 152 through DC power connection 130 to maintain voltage on DC power connection 130 at or above first minimum voltage threshold $V_1$. If so, then methodology 600 proceeds to step 618, where adapter secondary controller 121 continues to monitor voltage on DC power connection 130 (as indicated by time segment 3 of FIG. 7) until voltage on DC power connection 130 drops from first minimum voltage threshold $V_1$ to below a second minimum voltage threshold $V_2$ that is set lower than the first minimum voltage threshold $V_1$, e.g., $V_2$ may be about 3 volts and $V_1$ may be about 5 volts in one exemplary embodiment, although greater and lesser values are possible for each threshold, respectively. In one exemplary embodiment, output voltage on DC power connection 130 may be considered to be maintained at first minimum voltage threshold $V_1$ if the output voltage does not drop below $V_1$ within a minimum low voltage threshold operating time ($T_{MAX2}$), such as for example, a time period of about 30 seconds or other selected greater or lesser value. In this exemplary embodiment, if it is determined that output voltage is maintained at or above $V_1$ for at least the minimum low voltage threshold operating time ($T_{MAX2}$), a higher threshold $V_2$ may be used for turning on the primary side switcher circuitry 108 when the system 504 releases the hold at $V_1$. Under such circumstances in such an embodiment, it is quicker to recover to full operation at $V_2$ then to wait until the voltage decays to a minimum (or "floor") voltage threshold $V_3$ described below, thus shortening the delay between the time of a decision to return to system normal operation and achieving normal operation when the system 504 is providing DC secondary voltage to AC-DC adapter 502.

However, if adapter secondary controller 121 determines in step 610 that there is not sufficient power provided from smart battery 152 to maintain voltage on DC power connection 130 at or above first minimum voltage threshold $V_1$, then adapter secondary controller 121 may be configured to confirm in step 612 that there is sufficient power available from smart battery 152 to maintain secondary controller 121 in an operational state during the time that DC-powered information handling system 502 is in a non-operational host power state. In this regard, secondary controller 121 determines in step 612 if voltage on DC power connection 130 has dropped below a third minimum voltage threshold $V_3$ which is selected to be lower than voltage thresholds $V_1$ and $V_2$, such that $V_3$ represents the absolute minimum (or "floor") voltage available from smart battery 152 that selected to allow adapter secondary controller 121 to continue to be powered by smart battery 152. Third minimum voltage threshold $V_3$ may be selected based on minimum operational voltage for embedded controller in DC-powered system 504, and may in one exemplary embodiment be about 2 volts, although suitable greater or lesser voltage values are possible in other embodiments. In one exemplary embodiment, voltage values on DC power connection 130 that are less than minimum voltage threshold $V_3$ may be considered an indication that smart battery 152 is not sufficiently charged to reliably maintain adapter secondary controller 121 in an operational state.

Thus, if in step 612 secondary controller 121 determines that voltage on DC power connection 130 has dropped below the third minimum voltage threshold $V_3$, then methodology 600 proceeds to step 614, where secondary controller 121 turns adapter side switcher circuitry 121 back on as illustrated in FIG. 8. Secondary controller 121 then determines in step 616 if the output power demand on DC output power connection 130 remains below the minimum operating power threshold ($P_{MIN}$). If so, then methodology 600 returns to step 606 as shown, and methodology repeats as before. FIG. 8 illustrates the resulting voltage cycling between $V_N$ and $V_3$ from the "on" and "off" cycling saw tooth action of adapter primary switcher circuitry 108 that recharges output capacitive element 123 sufficiently to power secondary controller 121 during those times that DC-powered information handling system is in a non-operational host power state (power demand on DC output power connection 130 less than $P_{MIN}$) when information handling system 504 does not provide power to bi-directional DC power connection 130. However, if in step 616, the output power demand on DC output power connection 130 is no longer below the minimum operating power threshold ($P_{MIN}$), then methodology 600 returns to step 604 and repeats from the beginning as shown in FIG. 6.

Still referring to FIG. 6, once methodology 600 has reached step 618, then adapter secondary controller 121 continues to monitor voltage on DC power connection 130 and maintains adapter switcher circuitry 121 in non-operating or "off" condition for as long as the voltage on DC-power connection 130 is held above second minimum voltage threshold $V_2$ by system side embedded controller 150 using voltage provided from smart battery 152, as indicated by time segment 3 of FIG. 7. System side embedded controller 150 may in turn be configured to control power switching circuitry 154 in order to drop the voltage held on DC power connection 130 to below $V_2$ when embedded controller 150 detects that DC-powered information handling system 504 has again entered a higher power state (or alternatively when EC 150 determines that DC-powered information handling system 504 desires or is otherwise ready to transition back from a reduced power state to a higher power state), as indicated by time segment 4 in FIG. 7. Thus, when adapter secondary controller 121 detects in step 618 that voltage held on DC power connection 130 has dropped to below $V_2$, then adapter secondary controller 121 utilizes AD/DC & regulation circuitry 118 to provide control signals 128 to adapter primary side controller 128 to turn "on" adapter primary side switcher circuitry 108 in step 620 so as to return voltage on DC power connection 130 to normal operating voltage $V_N$, as indicated by time segment 5 in FIG. 7. Methodology 600 then returns to step 604 as shown. In this way, system side embedded controller 150 controls adapter primary side switcher circuitry 108 to be non-operational or "off" during those times that DC-powered information handling system 504 is in a non-operational host power state, and to be "on" when DC-powered information handling system 504 is in a higher power or working operational state.

It will be understood that methodologies 200 and 600 of respective FIGS. 2 and 6 are exemplary only, and that methodologies employing additional, fewer, and/or alternative steps may be employed that are suitable for enabling a DC-powered system to control primary side switching circuitry of an AC-DC adapter that is connected to provide DC power to the DC-powered information handling system.

It will also be understood that one or more of the tasks, functions, or methodologies described herein (e.g., for system embedded controller 150, adapter primary controller 131, adapter secondary controller 121, etc.) may be implemented, for example, as firmware or other computer program of instructions embodied in a non-transitory tangible computer readable medium that is executed by one or more processing devices such as CPU, controller, microcontroller, processor, microprocessor, FPGA, ASIC, or other suitable processing devices.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touch screen and/or a video display. The information handling system may also include one or more buses operable to transmit communications between the various hardware components.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed systems and methods may be utilized in various combinations and/or independently. Thus the invention is not limited to only those combinations shown herein, but rather may include other combinations.

What is claimed is:

1. A system, comprising:
an AC-DC adapter system having AC primary side switcher circuitry and a DC secondary side that is configured to receive power from the AC primary side switcher circuitry and to produce a DC power output therefrom;
a DC-powered information handling system coupled by a DC power connection to receive DC power from the DC power output of the AC-DC adapter system, the DC-powered information handling system comprising:
   a DC-powered system load, the system load being configured to operate in a first higher powered state and a second reduced power state,
   a battery system including one or more battery cells coupled to provide DC power to the system load, and
   at least one first processing device separate from the system load, the at least one first processing device being configured to operate when the system load is operating in the second reduced power state;
where the DC-powered information handling system is configured to be coupled by a DC power connection to receive DC power from the AC-DC adapter system;

where the at least one first processing device of the DC-powered information handling system is configured to command circuitry of the AC-DC adapter system so as to cause operation of the AC primary side switcher circuitry to remain in an enabled on condition for as long as the DC-powered information handling system is operating in the first higher powered state so as to maintain the adapter DC output voltage at a continuous non-zero operating voltage, and to disable or pulse operation of the AC primary side switcher circuitry for as long as the DC-powered information handling system is operating in the second reduced powered state;

where the DC secondary side of the AC-DC adapter system further comprises a capacitive element coupled between a transformer and a DC power output of the AC-DC adapter system:

where the at least one first processing device of the DC-powered information handling system is configured to command circuitry of the AC-DC adapter to enable operation of the AC primary side switcher circuitry when the DC-powered information handling system is operating in the first higher powered state, and to pulse operation of the AC primary side switcher circuitry on and off when the DC-powered information handling system is operating in the second reduced powered state in order to repeatedly allow the capacitive element to discharge to power DC secondary side control circuitry of the AC-DC adapter when the AC primary side circuitry is off and to recharge the output capacitive element when the AC primary side circuitry is on so as to continuously power DC secondary side control circuitry of the AC-DC adapter when the DC-powered information handling system is operating in the second reduced powered state.

2. The system of claim 1, where the at least one processing device of the DC-powered information handling system is coupled to transmit command signals to DC secondary side control circuitry of the AC-DC adapter to instruct the DC secondary side control circuitry to control the AC primary side switcher circuitry of the AC-DC adapter to selectably enable and disable operation of the AC primary side switcher circuitry.

3. The system of claim 1, where the at least one processing device of the DC-powered information handling system is coupled to transmit command signals across a power supplier identifier (PSID) data channel separate from the DC power connection to DC secondary side control circuitry of the AC-DC adapter to instruct the DC secondary side control circuitry to control the AC primary side switcher circuitry of the AC-DC adapter to selectably enable and disable operation of the AC primary side switcher circuitry.

4. The system of claim 1, where the system load of the DC-powered information handling system includes at least one second processing device that is configured to execute an operating system; where the second processing device is configured to be active and to execute the operating system when the system load is operating in the first higher powered state; and where the second processing device is configured to be inactive and not execute the operating system when the system load is operating in the second non-operational host power state.

5. A system, comprising:
an AC-DC adapter system having AC primary side switcher circuitry and a DC secondary side that is configured to receive power from the AC primary side switcher circuitry and to produce a DC power output therefrom:
a DC-powered information handling system coupled by a DC power connection to receive DC power from the DC power output of the AC-DC adapter system, the DC-powered information handling system comprising:
a DC-powered system load, the system load being configured to operate in a first higher powered state and a second reduced power state,
a battery system including one or more battery cells coupled to provide DC power to the system load, and
at least one first processing device separate from the system load, the at least one first processing device being configured to operate when the system load is operating in the second reduced power state;
where the DC-powered information handling system is configured to be coupled by a DC power connection to receive DC power from the AC-DC adapter system; and
where the at least one first processing device of the DC-powered information handling system is configured to command circuitry of the AC-DC adapter to enable operation of the AC primary side switcher circuitry when the DC-powered information handling system is operating in the first higher powered state and to disable operation of the AC primary side switcher circuitry when the DC-powered information handling system is operating in the second reduced powered state; where the DC-powered information handling system further comprises power switching circuitry coupled to control flow of DC current between the one or more battery cells of the battery system and the DC power connection when the DC-powered information handling system is coupled to receive DC power from the AC-DC adapter system; and where the at least one first processing device of the DC-powered information handling system is configured to control the power switching circuitry to provide DC power across the DC power connection from the battery system to power DC secondary side control circuitry of the AC-DC adapter when the DC-powered information handling system is operating in the second reduced powered state and the AC primary side switcher circuitry is disabled.

6. The system of claim 5, where the AC primary side switcher circuitry of the AC/DC adapter system is configured to be coupled to receive and control supply of power to the DC secondary side from an AC mains power supply; and where the at least one first processing device of the DC-powered information handling system is configured to control the power switching circuitry to provide DC power across the DC power connection from the battery system to power DC secondary side control circuitry of the AC-DC adapter when the DC-powered information handling system is operating in the second reduced powered state and the AC primary side switcher circuitry is disabled such that no AC mains current is consumed by the AC-DC adapter during the time DC power is provided across the DC power connection from the battery system to power the DC secondary side control circuitry.

7. A system, comprising: an AC-DC adapter system having AC primary side switcher circuitry and a DC secondary side that is configured to receive power from the AC primary side switcher circuitry and to produce a DC power output therefrom; a DC-powered information handling system coupled by a DC power connection to receive DC power from the DC power output of the AC-DC adapter system, the DC-powered information handling system comprising: a DC-powered system load, the system load being configured to operate in a first higher powered state and a second reduced power state, a battery system including one or more battery cells coupled to provide DC power to the system load, and at least one first processing device separate from the system load, the at least one first processing device being configured to operate when the system load is operating in the second reduced power state; where the DC-powered information handling system is configured to be coupled by a DC power connection to receive DC power from the AC-DC adapter system;

where the at least one first processing device of the DC-powered information handling system is configured to command circuitry of the AC-DC adapter system so as to cause operation of the AC primary side switcher circuitry to remain in an enabled on condition for as long as the DC-powered information handling system is operating in the first higher powered state so as to maintain the adapter DC output voltage at a continuous non-zero operating voltage, and to disable or pulse operation of the AC primary side switcher circuitry for as long as the DC-powered information handling system is operating in the second reduced powered state; where no communication path exists for communicating adapter operation command signals from the DC-powered information handling system to the AC-DC adapter; where the DC secondary side control circuitry of the AC-DC adapter is configured to sense power demand from the DC-powered information handling system on the DC power connection, and to disable the AC primary side switcher circuitry without receiving an adapter operation command signal from the DC-power information handling system when the power demand from the DC-powered information handling system drops below a minimum operating power threshold (PMIN) as a result of the system load transitioning from the first higher powered state to the second reduced power state; where the DC-powered information handling system further comprises power switching circuitry coupled to control flow of DC current between the one or more battery cells of the battery system and the DC power connection; where the at least one first processing device of the DC-powered information handling system is configured to sense voltage on the DC power connection; and where the at least one first processing device of the DC-powered information handling system is configured to control the power switching circuitry to provide DC power across the DC power connection from the battery system to power DC secondary side control circuitry of the AC-DC adapter when the at least one first processing device senses that a voltage on the DC power connection has dropped from a first normal operating voltage that occurs when the primary side switcher circuitry is operating, to below a first minimum voltage threshold that is less than the first normal operating voltage that occurs when the primary side switcher circuitry is disabled, the at least one first processing device of the DC-powered information handling system being configured to so control the power switching circuitry to provide DC power across the DC power connection from the battery system to power DC secondary side control circuitry of the AC-DC adapter to maintain voltage on the DC power connection above a second minimum voltage threshold that is below the first minimum voltage threshold.

8. The system of claim 7, where the DC secondary side control circuitry of the AC-DC adapter is configured to sense voltage on the DC power connection; where the at least one first processing device of the DC-powered information handling system is configured to control the power switching circuitry to reduce or cease providing DC power across the DC power connection from the battery system to power DC secondary side control circuitry of the AC-DC adapter such that the voltage on the DC power connection drops below the second minimum voltage threshold when the at least one first processing device senses that the system load of the DC-powered information handling system has entered the first higher powered state or determines that the system load of the DC-powered information handling system is ready to enter the first higher powered state; and where the DC secondary side control circuitry of the AC-DC adapter is configured to enable the AC primary side switcher circuitry without receiving an adapter operation command signal from the DC-power information handling system when the DC secondary side control circuitry senses that the voltage on the DC power connection has dropped below the second minimum voltage threshold.

9. A DC-powered information handling system, comprising:
  a DC-powered system load, the system load being configured to operate in a first higher powered state and a second reduced power state;
  a battery system including one or more battery cells coupled to provide DC power to the system load; and
  at least one first processing device separate from the system load, the at least one first processing device being configured to operate when the system load is operating in the reduced power state;
  where the DC-powered information handling system is configured to be coupled by a DC power connection to receive DC power from an AC-DC adapter system having AC primary side switcher circuitry and a DC secondary side that receives power from the AC primary side switcher circuitry;
  where the at least one first processing device of the DC-powered information handling system is configured when coupled to the DC-powered information handling system to command circuitry of the AC-DC adapter system so as to cause operation of the AC primary side switcher circuitry to remain in an enabled on condition for as long as the DC-powered information handling system is operating in the first higher powered state so as to maintain the adapter DC output voltage at a continuous non-zero operating voltage, and to disable or pulse operation of the AC primary side switcher circuitry for as long as the DC-powered information handling system is operating in the second reduced powered state;
  where the DC secondary side of the AC-DC adapter system further comprises a capacitive element coupled between a transformer and a DC power output of the AC-DC adapter system: where the at least one first processing device of the DC-powered information handling system is configured to command circuitry of the AC-DC adapter to enable operation of the AC primary side switcher circuitry when the DC-powered information handling system is operating in the first higher powered state, and to pulse operation of the AC primary side switcher circuitry on and off when the DC-powered information handling system is operating in the second reduced powered state in order to repeatedly allow the capacitive element to discharge to power DC secondary side control circuitry of the AC-DC adapter when the AC primary side circuitry is off and to recharge the output capacitive element when the AC primary side circuitry is on so as to continuously power DC secondary side control circuitry of the AC-DC adapter when the DC-powered information handling system is operating in the second reduced powered state.

10. The DC-powered information handling system of claim 9, where the at least one processing device of the DC-powered information handling system is configured to be coupled to transmit command signals to DC secondary side control circuitry of the AC-DC adapter to instruct the DC secondary side control circuitry to control the AC primary side switcher circuitry of the AC-DC adapter to selectably enable and disable operation of the AC primary side switcher circuitry.

11. The DC-powered information handling system of claim 9, where the system load of the DC-powered information handling system includes at least one second processing device that is configured to execute an operating system; where the second processing device is configured to be active and to execute the operating system when the system load is operating in the first higher powered state; and where the second processing device is configured to be inactive and not execute the operating system when the system load is operating in the second reduced power state.

12. A DC-powered information handling system, comprising:
a DC-powered system load, the system load being configured to operate in a first higher powered state and a second reduced power state;
a battery system including one or more battery cells coupled to provide DC power to the system load; and
at least one first processing device separate from the system load, the at least one first processing device being configured to operate when the system load is operating in the reduced power state;
where the DC-powered information handling system is configured to be coupled by a DC power connection to receive DC power from an AC-DC adapter system having AC primary side switcher circuitry and a DC secondary side that receives power from the AC primary side switcher circuitry;
where the at least one first processing device of the DC-powered information handling system is configured when coupled to the DC-powered information handling system to command circuitry of an AC-DC adapter so as to enable operation of the AC primary side switcher circuitry when the DC-powered information handling system is operating in the first higher powered state and to disable or pulse operation of the AC primary side switcher circuitry when the DC-powered information handling system is operating in the second reduced powered state; and
where the DC-powered information handling system further comprises power switching circuitry coupled to control flow of DC current between the one or more battery cells of the battery system and the DC power connection when the DC-powered information handling system is coupled to receive DC power from the AC-DC adapter system; where the at least one first processing device of the DC-powered information handling system is configured to sense voltage on the DC power connection; and where the at least one first processing device of the DC-powered information handling system is configured to control the power switching circuitry to provide DC power across the DC power connection from the battery system to power DC secondary side control circuitry of the AC-DC adapter when the at least one first processing device senses that a voltage on the DC power connection has dropped from a first normal operating voltage that occurs when the primary side switcher circuitry is operating, to below a minimum voltage threshold that occurs when the primary side switcher circuitry is disabled.

13. A method of operating a DC-powered information handling system and an AC-DC adapter coupled to the DC-powered information handling system by a DC power connection, the method comprising:
providing the AC-DC adapter system having AC primary side switcher circuitry and a DC secondary side;
receiving power in the DC secondary side from the AC primary side switcher circuitry and producing a DC power output from the DC secondary side;
providing the DC-powered information handling system having a system load, a battery system including one or more battery cells coupled to provide DC power to the system load, and at least one first processing device separate from the system load, the DC-powered information handling system being coupled by the DC power connection to receive DC power from the DC power output across the DC power connection;
operating the system load being in a first higher powered state and a second reduced power state;
operating the at least one first processing device of the DC-powered information handling system when the system load is operating in the second reduced power state;
using the at least one first processing device of the DC-powered information handling system to command circuitry of the AC-DC adapter system so as to cause operation of the AC primary side switcher circuitry to remain in an enabled on condition for as long as the DC-powered information handling system is operating in the first higher powered state so as to maintain the adapter DC output voltage at a continuous non-zero operating voltage, and to disable or pulse operation of the AC primary side switcher circuitry for as long as the DC-powered information handling system is operating in the second reduced powered state; and
where the DC secondary side of the AC-DC adapter system further comprises a capacitive element coupled between a transformer and a DC power output of the AC-DC adapter system; and where the method further comprises using the at least one first processing device of the DC-powered information handling system to command circuitry of the AC-DC adapter to enable operation of the AC primary side switcher circuitry when the DC-powered information handling system is operating in the first higher powered state, and to pulse operation of the AC primary side switcher circuitry on and off when the DC-powered information handling system is operating in the second reduced powered state in order to repeatedly allow the capacitive element to discharge to power DC secondary side control circuitry of the AC-DC adapter when the AC primary side circuitry is off and to recharge the output capacitive element when the AC primary side circuitry is on so as to continuously power DC secondary side control circuitry of the AC-DC adapter when the DC-powered information handling system is operating in the second reduced powered state.

14. The method of claim 13, further comprising using the at least one processing device of the DC-powered information handling system to transmit command signals to DC secondary side control circuitry of the AC-DC adapter to instruct the DC secondary side control circuitry to control the AC primary side switcher circuitry of the AC-DC adapter to selectably enable and disable operation of the AC primary side switcher circuitry.

15. The method of claim 13, further comprising using the at least one processing device of the DC-powered information handling system to transmit command signals across a power supplier identifier (PSID) data channel separate from the DC power connection to DC secondary side control circuitry of the AC-DC adapter to instruct the DC secondary side control circuitry to control the AC primary side switcher circuitry of the AC-DC adapter to selectably enable and disable operation of the AC primary side switcher circuitry.

16. The method of claim 13, where the system load of the DC-powered information handling system includes at least one second processing device configured to execute an operating system; and where the method further comprises activating the second processing device to execute the operating system when the system load is operating in the first higher powered state; and deactivating the second processing device not executing the operating system on the second processing device when the system load is operating in the second reduced power state.

17. A method of operating a DC-powered information handling system and an AC-DC adapter coupled to the DC-powered information handling system by a DC power connection, the method comprising:
providing the AC-DC adapter system having AC primary side switcher circuitry and a DC secondary side;
receiving power in the DC secondary side from the AC primary side switcher circuitry and producing a DC power output from the DC secondary side;
providing the DC-powered information handling system having a system load, a battery system including one or more battery cells coupled to provide DC power to the system load, and at least one first processing device separate from the system load, the DC-powered information handling system being coupled by the DC power connection to receive DC power from the DC power output across the DC power connection;
operating the system load in a first higher powered state and a second reduced power state;
operating the at least one first processing device of the DC-powered information handling system when the system load is operating in the second reduced power state; and
using the at least one first processing device of the DC-powered information handling system to command circuitry of the AC-DC adapter to enable operation of the AC primary side switcher circuitry when the DC-powered information handling system is operating in the first higher powered state and to disable operation of the AC primary side switcher circuitry when the DC-powered information handling system is operating in the second reduced powered state; where the DC-powered information handling system further comprises power switching circuitry coupled to control flow of DC current between the one or more battery cells of the battery system and the DC power connection when the DC-powered information handling system is coupled to receive DC power from the AC-DC adapter system; and where the method further comprises using the at least one first processing device of the DC-powered information handling system to control the power switching circuitry to provide DC power across the DC power connection from the battery system to power DC secondary side control circuitry of the AC-DC adapter when the DC-powered information handling system is operating in the second reduced powered state and the AC primary side switcher circuitry is disabled.

18. A method of operating a DC-powered information handling system and an AC-DC adapter coupled to the DC-powered information handling system by a DC power connection, the method comprising:
providing the AC-DC adapter system having AC primary side switcher circuitry and a DC secondary side;
receiving power in the DC secondary side from the AC primary side switcher circuitry and producing a DC power output from the DC secondary side;
providing the DC-powered information handling system having a system load, a battery system including one or more battery cells coupled to provide DC power to the system load, and at least one first processing device separate from the system load, the DC-powered information handling system being coupled by the DC power connection to receive DC power from the DC power output across the DC power connection;
operating the system load in a first higher powered state and a second reduced power state;
operating the at least one first processing device of the DC-powered information handling system when the system load is operating in the second reduced power state;
using the at least one first processing device of the DC-powered information handling system to command circuitry of the AC-DC adapter system so as to cause operation of the AC primary side switcher circuitry to remain in an enabled on condition for as long as the DC-powered information handling system is operating in the first higher powered state so as to maintain the adapter DC output voltage at a continuous non-zero operating voltage, and to disable or pulse operation of the AC primary side switcher circuitry for as long as the DC-powered information handling system is operating in the second reduced powered state;
where no communication path exists for communicating adapter operation command signals from the DC-powered information handling system to the AC-DC adapter; where the DC-powered information handling system further comprises power switching circuitry coupled to control flow of DC current between the one or more battery cells of the battery system and the DC power connection when the DC-powered information handling system is coupled to receive DC power from the AC-DC adapter system, the method further comprising:
using the DC secondary side control circuitry of the AC-DC adapter to sense power demand from the DC-powered information handling system on the DC power connection, and to disable the AC primary side switcher circuitry without receiving an adapter operation command signal from the DC-power information handling system when the power demand from the DC-powered information handling system drops below a minimum operating power threshold (PMN) as a result of the system load transitioning from the first higher powered state to the second reduced power state;
using the at least one first processing device of the DC-powered information handling system to sense voltage on the DC power connection, and control the power switching circuitry to provide DC power across the DC power connection from the battery system to power DC secondary side control circuitry of the AC-DC adapter when the at least one first processing device senses that a voltage on the DC power connection has dropped from a first normal operating voltage that occurs when the primary side switcher circuitry is operating, to below a first minimum voltage threshold that is less than the first normal operating voltage that occurs when the primary side switcher circuitry is disabled so as to maintain voltage on the DC power connection above a second minimum voltage threshold that is below the first minimum voltage threshold.

19. The method of claim 18, where the DC secondary side control circuitry of the AC-DC adapter is configured to sense voltage on the DC power connection; and where the method further comprises:

using the at least one first processing device of the DC-powered information handling system to control the power switching circuitry to reduce or cease providing DC power across the DC power connection from the battery system to power DC secondary side control circuitry of the AC-DC adapter such that the voltage on the DC power connection drops below the second minimum voltage threshold when the at least one first processing device determines that the system load of the DC-powered information handling system has entered the first higher powered state or determines that the system load of the DC-powered information handling system is ready to enter the first higher powered state; and using the DC secondary side control circuitry of the AC-DC adapter to enable the AC primary side switcher circuitry without receiving an adapter operation command signal from the DC-power information handling system when the DC secondary side control circuitry senses that the voltage on the DC power connection has dropped below the second minimum voltage threshold.

20. A system, comprising: an AC-DC adapter system having AC primary side switcher circuitry and a DC secondary side that is configured to receive power from the AC primary side switcher circuitry and to produce a DC power output therefrom; a DC-powered information handling system coupled by a DC power connection to receive DC power from the DC power output of the AC-DC adapter system, the DC-powered information handling system comprising: a DC-powered system load, the system load being configured to operate in a first higher powered state and a second reduced power state, a battery system including one or more battery cells coupled to provide DC power to the system load, and at least one first processing device separate from the system load, the at least one first processing device being configured to operate when the system load is operating in the second reduced power state; where the DC-powered information handling system is configured to be coupled by a DC power connection to receive DC power from the AC-DC adapter system; where the at least one first processing device of the DC-powered information handling system is configured to command circuitry of the AC-DC adapter system so as to cause operation of the AC primary side switcher circuitry to remain in an enabled on condition for as long as the DC-powered information handling system is operating in the first higher powered state so as to maintain the adapter DC output voltage at a continuous non-zero operating voltage, and to disable or pulse operation of the AC primary side switcher circuitry for as long as the DC-powered information handling system is operating in the second reduced powered state;

where no communication path exists for communicating adapter operation command signals from the DC-powered information handling system to the AC-DC adapter; and where the DC secondary side control circuitry of the AC-DC adapter is configured to:

sense power demand from the DC-powered information handling system on the DC power connection, and to disable the AC primary side switcher circuitry without receiving an adapter operation command signal from the DC-power information handling system when the power demand from the DC-powered information handling system drops below a minimum operating power threshold (PMN) as a result of the system load transitioning from the first higher powered state to the second reduced power state; and sense voltage on the DC power connection, and to enable the AC primary side switcher circuitry without receiving an adapter operation command signal from the DC-power information handling system when the DC secondary side control circuitry senses that the voltage on the DC power connection has dropped below the second minimum voltage threshold.

21. A system, comprising: an AC-DC adapter system having AC primary side switcher circuitry and a DC secondary side that is configured to receive power from the AC primary side switcher circuitry and to produce a DC power output therefrom; a DC-powered information handling system coupled by a DC power connection to receive DC power from the DC power output of the AC-DC adapter system, the DC-powered information handling system comprising: a DC-powered system load, the system load being configured to operate in a first higher powered state and a second reduced power state, a battery system including one or more battery cells coupled to provide DC power to the system load, and at least one first processing device separate from the system load, the at least one first processing device being configured to operate when the system load is operating in the second reduced power state; where the DC-powered information handling system is configured to be coupled by a DC power connection to receive DC power from the AC-DC adapter system; where the at least one first processing device of the DC-powered information handling system is configured to command circuitry of the AC-DC adapter system so as to cause operation of the AC primary side switcher circuitry to remain in an enabled on condition for as long as the DC-powered information handling system is operating in the first higher powered state so as to maintain the adapter DC output voltage at a continuous non-zero operating voltage, and to disable or pulse operation of the AC primary side switcher circuitry for as long as the DC-powered information handling system is operating in the second reduced powered state;

where the DC-powered information handling system further comprises power switching circuitry coupled to control flow of DC current between the one or more battery cells of the battery system and the DC power connection; where the at least one first processing device of the DC-powered information handling system is configured to:

sense voltage on the DC power connection; and where the at least one first processing device of the DC-powered information handling system is configured to control the power switching circuitry to provide DC power across the DC power connection from the battery system to power DC secondary side control circuitry of the AC-DC adapter when the at least one first processing device senses that a voltage on the DC power connection has dropped from a first normal operating voltage that occurs when the primary side switcher circuitry is operating, to below a first minimum voltage threshold that is less than the first normal operating voltage that occurs when the primary side switcher circuitry is disabled, the at least one first processing device of the DC-powered information handling system being configured to so control the power switching circuitry to provide DC power across the DC power connection from the battery system to power DC secondary side control circuitry of the AC-DC adapter to maintain voltage on the DC power connection above a second minimum voltage threshold that is below the first minimum voltage threshold; and control the power switching circuitry to reduce or cease providing DC power across the DC power connection from the battery system to power DC secondary side control circuitry of the AC-DC adapter such that the voltage on the DC power connection drops below the second minimum voltage threshold when the at least one first processing device senses that the system load of the DC-powered information handling system has entered the first higher powered state or determines that the system load of the DC-powered information handling system is ready to enter the first higher powered state.

22. A system, comprising: an AC-DC adapter system having AC primary side switcher circuitry and a DC secondary side that is configured to receive power from the AC primary side switcher circuitry and to produce a DC power output therefrom; a DC-powered information handling system coupled by a DC power connection to receive DC power from the DC power output of the AC-DC adapter system, the DC-powered information handling system comprising: a DC-powered system load, the system load being configured to operate in a first higher powered state and a second reduced power state, a battery system including one or more battery cells coupled to provide DC power to the system load, and at least one first processing device separate from the system load, the at least one first processing device being configured to operate when the system load is operating in the second reduced power state; where the DC-powered information handling system is configured to be coupled by a DC power connection to receive DC power from the AC-DC adapter system;

where the at least one first processing device of the DC-powered information handling system is configured to command circuitry of the AC-DC adapter system so as to cause operation of the AC primary side switcher circuitry to remain in an enabled on condition for as long as the DC-powered information handling system is operating in the first higher powered state so as to maintain the adapter DC output voltage at a continuous non-zero operating voltage, and to disable or pulse operation of the AC primary side switcher circuitry for as long as the DC-powered information handling system is operating in the second reduced powered state;

where the at least one first processing device of the DC-powered information handling system is configured to monitor the real time charge of the battery system and:

cause operation of the AC primary side switcher circuitry be disabled for as long as the DC-powered information handling system is operating in the second reduced powered state if the monitored battery system charge is above a minimum battery capacity threshold; and cause operation of the AC primary side switcher circuitry be pulsed for as long as the DC-powered information handling system is operating in the second reduced powered state if the monitored battery system charge is not above the minimum battery capacity threshold.

23. A DC-powered information handling system, comprising: a DC-powered system load, the system load being configured to operate in a first higher powered state and a second reduced power state; a battery system including one or more battery cells coupled to provide DC power to the system load; and at least one first processing device separate from the system load, the at least one first processing device being configured to operate when the system load is operating in the reduced power state; where the DC-powered information handling system is configured to be coupled by a DC power connection to receive DC power from an AC-DC adapter system having AC primary side switcher circuitry and a DC secondary side that receives power from the AC primary side switcher circuitry; where the at least one first processing device of the DC-powered information handling system is configured when coupled to the DC-powered information handling system to command circuitry of the AC-DC adapter system so as to cause operation of the AC primary side switcher circuitry to remain in an enabled on condition for as long as the DC-powered information handling system is operating in the first higher powered state so as to maintain the adapter DC output voltage at a continuous non-zero operating voltage, and to disable or pulse operation of the AC primary side switcher circuitry for as long as the DC-powered information handling system is operating in the second reduced powered state; where the DC-powered information handling system further comprises power switching circuitry coupled to control flow of DC current between the one or more battery cells of the battery system and the DC power connection; where the at least one first processing device of the DC-powered information handling system is configured to:

sense voltage on the DC power connection; and where the at least one first processing device of the DC-powered information handling system is configured to control the power switching circuitry to provide DC power across the DC power connection from the battery system to power DC secondary side control circuitry of the AC-DC adapter when the at least one first processing device senses that a voltage on the DC power connection has dropped from a first normal operating voltage that occurs when the primary side switcher circuitry is operating, to below a first minimum voltage threshold that is less than the first normal operating voltage that occurs when the primary side switcher circuitry is disabled, the at least one first processing device of the DC-powered information handling system being configured to so control the power switching circuitry to provide DC power across the DC power connection from the battery system to power DC secondary side control circuitry of the AC-DC adapter to maintain voltage on the DC power connection above a second minimum voltage threshold that is below the first minimum voltage threshold; and control the power switching circuitry to reduce or cease providing DC power across the DC power connection from the battery system to power DC secondary side control circuitry of the AC-DC adapter such that the voltage on the DC power connection drops below the second minimum voltage threshold when the at least one first processing device senses that the system load of the DC-powered information handling system has entered the first higher powered state or determines that the system load of the DC-powered information handling system is ready to enter the first higher powered state.

24. A DC-powered information handling system, comprising: a DC-powered system load, the system load being configured to operate in a first higher powered state and a second reduced power state; a battery system including one or more battery cells coupled to provide DC power to the system load; and at least one first processing device separate from the system load, the at least one first processing device being configured to operate when the system load is operating in the reduced power state; where the DC-powered information handling system is configured to be coupled by a DC power connection to receive DC power from an AC-DC adapter system having AC primary side switcher circuitry and a DC secondary side that receives power from the AC primary side switcher circuitry; where the at least one first processing device of the DC-powered information handling system is configured when coupled to the DC-powered information handling system to command circuitry of the AC-DC adapter system so as to cause operation of the AC primary side switcher circuitry to remain in an enabled on condition for as long as the DC-powered information handling system is operating in the first higher powered state so as to maintain the adapter DC output voltage at a continuous non-zero operating voltage, and to disable or pulse operation of the AC primary side switcher circuitry for as long as the DC-powered information handling system is operating in the second reduced powered state; where the at least one first processing device of the DC-powered information handling system is configured to monitor the real time charge of the battery system and:

cause operation of the AC primary side switcher circuitry be disabled for as long as the DC-powered information handling system is operating in the second reduced powered state if the monitored battery system charge is above a minimum battery capacity threshold; and cause operation of the AC primary side switcher circuitry be pulsed for as long as the DC-powered information handling system is operating in the second reduced powered state if the monitored battery system charge is not above the minimum battery capacity threshold.

25. A method of operating a DC-powered information handling system and an AC-DC adapter coupled to the DC-powered information handling system by a DC power connection, the method comprising: providing the AC-DC adapter system having AC primary side switcher circuitry and a DC secondary side; receiving power in the DC secondary side from the AC primary side switcher circuitry and producing a DC power output from the DC secondary side; providing the DC-powered information handling system having a system load, a battery system including one or more battery cells coupled to provide DC power to the system load, and at least one first processing device separate from the system load, the DC-powered information handling system being coupled by the DC power connection to receive DC power from the DC power output across the DC power connection; operating the system load being in a first higher powered state and a second reduced power state; operating the at least one first processing device of the DC-powered information handling system when the system load is operating in the second reduced power state;

using the at least one first processing device of the DC-powered information handling system to command circuitry of the AC-DC adapter system so as to cause operation of the AC primary side switcher circuitry to remain in an enabled on condition for as long as the DC-powered information handling system is operating in the first higher powered state so as to maintain the adapter DC output voltage at a continuous non-zero operating voltage, and to disable or pulse operation of the AC primary side switcher circuitry for as long as the DC-powered information handling system is operating in the second reduced powered state; where the AC primary side switcher circuitry of the AC/DC adapter system is configured to be coupled to receive and control supply of power to the DC secondary side from an AC mains power supply; and where the method further comprises using the at least one first processing device of the DC-powered information handling system to control the power switching circuitry to provide DC power across the DC power connection from the battery system to power DC secondary side control circuitry of the AC-DC adapter when the DC-powered information handling system is operating in the second reduced powered state and the AC primary side switcher circuitry is disabled such that no AC mains current is consumed by the AC-DC adapter during the time DC power is provided across the DC power connection from the battery system to power the DC secondary side control circuitry.

26. A method of operating a DC-powered information handling system and an AC-DC adapter coupled to the DC-powered information handling system by a DC power connection, the method comprising: providing the AC-DC adapter system having AC primary side switcher circuitry and a DC secondary side; receiving power in the DC secondary side from the AC primary side switcher circuitry and producing a DC power output from the DC secondary side; providing the DC-powered information handling system having a system load, a battery system including one or more battery cells coupled to provide DC power to the system load, and at least one first processing device separate from the system load, the DC-powered information handling system being coupled by the DC power connection to receive DC power from the DC power output across the DC power connection; operating the system load being in a first higher powered state and a second reduced power state; operating the at least one first processing device of the DC-powered information handling system when the system load is operating in the second reduced power state;

using the at least one first processing device of the DC-powered information handling system to command circuitry of the AC-DC adapter system so as to cause operation of the AC primary side switcher circuitry to remain in an enabled on condition for as long as the DC-powered information handling system is operating in the first higher powered state so as to maintain the adapter DC output voltage at a continuous non-zero operating voltage, and to disable or pulse operation of the AC primary side switcher circuitry for as long as the DC-powered information handling system is operating in the second reduced powered state; where no communication path exists for communicating adapter operation command signals from the DC-powered information handling system to the AC-DC adapter; and where the method further comprises using the DC secondary side control circuitry of the AC-DC adapter to:
  sense power demand from the DC-powered information handling system on the DC power connection, and to disable the AC primary side switcher circuitry without receiving an adapter operation command signal from the DC-power information handling system when the power demand from the DC-powered information handling system drops below a minimum operating power threshold (PMN) as a result of the system load transitioning from the first higher powered state to the second reduced power state; and
  sense voltage on the DC power connection, and to enable the AC primary side switcher circuitry without receiving an adapter operation command signal from the DC-power information handling system when the DC secondary side control circuitry senses that the voltage on the DC power connection has dropped below the second minimum voltage threshold.

27. A method of operating a DC-powered information handling system and an AC-DC adapter coupled to the DC-powered information handling system by a DC power connection, the method comprising: providing the AC-DC adapter system having AC primary side switcher circuitry and a DC secondary side; receiving power in the DC secondary side from the AC primary side switcher circuitry and producing a DC power output from the DC secondary side; providing the DC-powered information handling system having a system load, a battery system including one or more battery cells coupled to provide DC power to the system load, and at least one first processing device separate from the system load, the DC-powered information handling system being coupled by the DC power connection to receive DC power from the DC power output across the DC power connection; operating the system load being in a first higher powered state and a second reduced power state; operating the at least one first processing device of the DC-powered information handling system when the system load is operating in the second reduced power state;
  using the at least one first processing device of the DC-powered information handling system to command circuitry of the AC-DC adapter system so as to cause operation of the AC primary side switcher circuitry to remain in an enabled on condition for as long as the DC-powered information handling system is operating in the first higher powered state so as to maintain the adapter DC output voltage at a continuous non-zero operating voltage, and to disable or pulse operation of the AC primary side switcher circuitry for as long as the DC-powered information handling system is operating in the second reduced powered state;
  where the DC-powered information handling system further comprises power switching circuitry coupled to control flow of DC current between the one or more battery cells of the battery system and the DC power connection; where the method further comprises using the at least one first processing device of the DC-powered information handling system to:
    sense voltage on the DC power connection; and where the at least one first processing device of the DC-powered information handling system is configured to control the power switching circuitry to provide DC power across the DC power connection from the battery system to power DC secondary side control circuitry of the AC-DC adapter when the at least one first processing device senses that a voltage on the DC power connection has dropped from a first normal operating voltage that occurs when the primary side switcher circuitry is operating, to below a first minimum voltage threshold that is less than the first normal operating voltage that occurs when the primary side switcher circuitry is disabled, the at least one first processing device of the DC-powered information handling system being configured to so control the power switching circuitry to provide DC power across the DC power connection from the battery system to power DC secondary side control circuitry of the AC-DC adapter to maintain voltage on the DC power connection above a second minimum voltage threshold that is below the first minimum voltage threshold; and
    control the power switching circuitry to reduce or cease providing DC power across the DC power connection from the battery system to power DC secondary side control circuitry of the AC-DC adapter such that the voltage on the DC power connection drops below the second minimum voltage threshold when the at least one first processing device senses that the system load of the DC-powered information handling system has entered the first higher powered state or determines that the system load of the DC-powered information handling system is ready to enter the first higher powered state.

28. A method of operating a DC-powered information handling system and an AC-DC adapter coupled to the DC-powered information handling system by a DC power connection, the method comprising: providing the AC-DC adapter system having AC primary side switcher circuitry and a DC secondary side; receiving power in the DC secondary side from the AC primary side switcher circuitry and producing a DC power output from the DC secondary side; providing the DC-powered information handling system having a system load, a battery system including one or more battery cells coupled to provide DC power to the system load, and at least one first processing device separate from the system load, the DC-powered information handling system being coupled by the DC power connection to receive DC power from the DC power output across the DC power connection; operating the system load being in a first higher powered state and a second reduced power state; operating the at least one first processing device of the DC-powered information handling system when the system load is operating in the second reduced power state;
  using the at least one first processing device of the DC-powered information handling system to command circuitry of the AC-DC adapter system so as to cause operation of the AC primary side switcher circuitry to remain in an enabled on condition for as long as the DC-powered information handling system is operating in the first higher powered state so as to maintain the adapter DC output voltage at a continuous non-zero operating voltage, and to disable or pulse operation of the AC primary side switcher circuitry for as long as the DC-powered information handling system is operating in the second reduced powered state; further comprising using the at least one first processing device of the DC-powered information handling system to:
    monitor the real time charge of the battery system;
    cause operation of the AC primary side switcher circuitry be disabled for as long as the DC-powered information handling system is operating in the second reduced powered state if the monitored battery system charge is above a minimum battery capacity threshold; and cause operation of the AC primary side switcher circuitry to be pulsed for as long as the DC-powered information handling system is operating in the second reduced powered state if the monitored battery system charge is not above the minimum battery capacity threshold.

\* \* \* \* \*